(12) United States Patent
Motoda et al.

(10) Patent No.: US 11,773,190 B2
(45) Date of Patent: Oct. 3, 2023

(54) MODIFIED LIQUID DIENE RUBBERS

(71) Applicant: KURARAY CO., LTD., Kurashiki (JP)

(72) Inventors: Satoshi Motoda, Chiyoda-ku (JP); Shuhei Kaneko, Kamisu (JP); Yu Nozasa, Chiyoda-ku (JP); Yosuke Uehara, Chiyoda-ku (JP); Masahiro Kashioka, Kamisu (JP); Yoshikazu Ueno, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 649 days.

(21) Appl. No.: 16/753,261

(22) PCT Filed: Oct. 2, 2018

(86) PCT No.: PCT/JP2018/036839
§ 371 (c)(1),
(2) Date: Apr. 2, 2020

(87) PCT Pub. No.: WO2019/069904
PCT Pub. Date: Apr. 11, 2019

(65) Prior Publication Data
US 2020/0308313 A1    Oct. 1, 2020

(30) Foreign Application Priority Data

Oct. 5, 2017 (JP) ................................ 2017-195144

(51) Int. Cl.
| | | |
|---|---|---|
| *C08C 19/34* | (2006.01) | |
| *B60C 1/00* | (2006.01) | |
| *C08L 7/00* | (2006.01) | |
| *C08L 15/00* | (2006.01) | |
| *C09K 3/10* | (2006.01) | |

(52) U.S. Cl.
CPC ............... *C08C 19/34* (2013.01); *B60C 1/00* (2013.01); *C08L 7/00* (2013.01); *C08L 15/00* (2013.01); *C09K 3/10* (2013.01); *B60C 2001/0058* (2013.01); *C08L 2205/025* (2013.01); *C08L 2205/035* (2013.01); *C09K 2200/0607* (2013.01)

(58) Field of Classification Search
CPC . C08C 19/34; C08L 7/00; C08L 15/00; C08L 2205/025; C08L 2205/035; B60C 1/00; B60C 2001/0058; C09K 3/10; C09K 2200/0607
USPC ........................................................ 525/207
See application file for complete search history.

(56) References Cited

U.S. PATENT DOCUMENTS

| | | | |
|---|---|---|---|
| 4,600,745 A | 7/1986 | Creighton | |
| 5,300,569 A | 4/1994 | Drake et al. | |
| 5,521,248 A | 5/1996 | Drake et al. | |
| 9,598,507 B2 | 3/2017 | Motoda et al. | |
| 10,414,834 B2 | 9/2019 | Motoda et al. | |
| 2016/0229927 A1 | 8/2016 | Motoda et al. | |
| 2018/0022835 A1* | 1/2018 | Motoda | C08C 19/02 524/525 |

FOREIGN PATENT DOCUMENTS

| | | |
|---|---|---|
| CN | 105408362 A | 3/2016 |
| CN | 107001490 A | 8/2017 |
| EP | 0 087 526 A1 | 9/1983 |
| EP | 3 118 251 A1 | 1/2017 |
| EP | 3 118 252 A1 | 1/2017 |
| EP | 3 239 132 A1 | 11/2017 |
| EP | 3 026 065 A1 | 6/2018 |
| JP | 58-147407 A | 9/1983 |
| JP | 59-6272 A | 1/1984 |
| JP | 5-59345 A | 3/1993 |
| JP | 5-194922 A | 8/1993 |
| JP | 6-506004 A | 7/1994 |
| JP | 2004-99651 A | 4/2004 |
| JP | 2009035682 A * | 2/2009 |
| JP | 2011-132298 A | 7/2011 |
| JP | 2013-227382 A | 11/2013 |
| JP | 2015086282 A * | 5/2015 |
| JP | 2016-27163 A | 2/2016 |

(Continued)

OTHER PUBLICATIONS

AMCP 706-356, "9-18.5 Bead," Chapter 9, AMC Pamphlet: Engineering Design Handbook, Automotive Series, Automotive Suspensions, U.S. Army Materiel Command, Washington D.C., 9-18. (Year: 1967).*

(Continued)

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

A modified liquid diene rubber (A) has a functional group (a) derived from an acid anhydride, and satisfies all the requirements (I) to (III) below: (I) The functional group equivalent weight of the functional groups (a) is in the range of 400 to 3,500 g/eq. (II) The polystyrene-equivalent number average molecular weight (Mn) measured by gel permeation chromatography (GPC) is in the range of 5,000 to 20,000. (III) The melt viscosity at 38° C. is not less than 3 Pa·s and X (K) is not less than 6100 K wherein X is the slope of a linear line passing through two points in a graph in which the two points are values of melt viscosity η (Pa·s) at 38° C. and 60° C. measured with a Brookfield viscometer which are plotted as Ln[η/(Pa·s)] on ordinate versus 1/T ($K^{-1}$) on abscissa (with the proviso that T is temperature (K)).

4 Claims, No Drawings

(56) References Cited

FOREIGN PATENT DOCUMENTS

| JP | 2017-14373 A | 1/2017 |
| TW | I520976 B | 2/2016 |
| WO | WO 2015/137296 A1 | 9/2015 |
| WO | WO 2016/104473 A1 | 6/2016 |

OTHER PUBLICATIONS

JP 2009035682 A, machine translation, EPO espacenet. (Year: 2009).*
JP 2015086282 A, machine translation, EPO espacenet. (Year: 2015).*
Combined Chinese Office Action and Search Report dated Jan. 17, 2022 in Chinese Patent Application No. 201880064747.X (with English translation of Categories of Cited Documents), citing documents AO and AP therein, 8 pages.
Combined Taiwanese Office Action and Search Report dated Dec. 6, 2021 in Taiwanese Patent Application No. 107134899 (with English translation of Categories of Cited Documents), citing document AQ therein, 8 pages.
Extended European Search Report dated Jun. 14, 2021 in European Patent Application No. 18864751.5, citing documents AO through AR therein, 7 pages.
International Search Report dated Dec. 18, 2018 in PCT/JP2018/036839, citing documents AA, AB, AJ-AQ therein, 2 pages.

\* cited by examiner

MODIFIED LIQUID DIENE RUBBERS

TECHNICAL FIELD

The present invention relates to a modified liquid diene rubber and a composition containing the modified liquid diene rubber.

BACKGROUND ART

Rubber compositions including solid rubbers, liquid rubbers, oils, etc. have outstanding adhesive properties and, by being crosslinked, give crosslinked products which exhibit excellent adhesion with respect to adherends and other surfaces. These rubber compositions are thus conventionally used as sealing materials, adhesives for bonding various parts, and the like in numerous industrial fields such as, for example, automobile field (see, for example, Patent Literatures 1 to 4). A known approach to improving properties of these rubber compositions such as adhesion with respect to metals, etc. is to use liquid rubbers modified with functional groups, namely, modified liquid rubbers (see, for example, Patent Literatures 2 and 4). These rubber compositions are usually used in the above-described applications such as sealing materials and adhesives in such a manner that components of the rubber composition are mixed together beforehand and stored in a container such as a hermetic container, and the rubber composition at the time of use is transferred from the hermetic container to a device such as a cartridge gun and is applied therefrom to a substrate or other surface, the rubber composition being then crosslinked.

CITATION LIST

Patent Literature

Patent Literature 1: JP-A-S59-006272
Patent Literature 2: JP-A-H05-194922
Patent Literature 3: JP-A-H05-059345
Patent Literature 4: JP-A-2004-099651

SUMMARY OF INVENTION

Technical Problem

Unfortunately, the conventional rubber compositions are unsatisfactory in pumpability, dripping resistance, processability and reactivity, and cured products obtained from the rubber compositions hardly satisfy rubber elasticity and adhesion with respect to various substrates. The present invention has been made in light of the circumstances discussed above, and provides a modified liquid diene rubber, and a rubber composition including the modified liquid diene rubber which are each excellent in pumpability, dripping resistance, processability and reactivity and give cured products having excellent rubber elasticity, mechanical characteristics (rigidity) and adhesion with respect to various substrates, and which are thus suitably used in or as a sealing material, an adhesive or pressure sensitive adhesive, a tire bead filler, and the like.

Solution to Problem

The present inventors carried out extensive studies and have found that a rubber composition containing a specific modified liquid diene rubber attains excellent pumpability, dripping resistance, processability and reactivity, and gives cured products having outstanding rubber elasticity, mechanical characteristics (rigidity) and adhesion with respect to various substrates. The present invention has been completed based on the finding.

Specifically, the present invention pertains to the following [1] to [7].

[1] A modified liquid diene rubber (A) having a functional group (a) derived from an acid anhydride, and satisfying all the requirements (I) to (III) below:

(I) the functional group equivalent weight of the functional groups (a) is in the range of 400 to 3,500 g/eq, (II) the polystyrene-equivalent number average molecular weight (Mn) measured by gel permeation chromatography (GPC) is in the range of 5,000 to 20,000, and (III) the melt viscosity at 38° C. is not less than 3 Pa·s and X (K) is not less than 6100 K wherein X is the slope of a linear line passing through two points in a graph in which the two points are values of melt viscosity η (Pa·s) at 38° C. and 60° C. measured with a Brookfield viscometer which are plotted as $Ln[\eta/(Pa\cdot s)]$ on ordinate versus $1/T$ $(K^{-1})$ on abscissa (with the proviso that T is temperature (K)).

[2] The modified liquid diene rubber (A) described in [1], wherein the modified liquid diene rubber (A) is a product of reaction of a liquid diene rubber modified with an unsaturated carboxylic acid anhydride, and a compound represented by the chemical formula (2) or (3) below:

$$R^a\text{—OH} \quad (2)$$

(wherein $R^a$ is a hydrogen atom or an optionally substituted alkyl group)

$$R^b{}_2\text{—NH} \quad (3)$$

(wherein $R^b$ at each occurrence is a hydrogen atom or an optionally substituted alkyl group and may be the same as or different from one another).

[3] A composition comprising the modified liquid diene rubber (A) described in [1] or [2].

[4] A rubber composition comprising the modified liquid diene rubber (A) described in [1] or [2], and a solid rubber (B).

[5] A sealing material comprising the rubber composition described in [4].

[6] A tire bead filler rubber composition comprising the rubber composition described in [4].

[7] The tire bead filler rubber composition described in [6], wherein the rubber composition comprises 100 parts by mass of the solid rubber (B), 1 to 20 parts by mass of the modified liquid diene rubber (A) described in [1] or [2], 5 to 40 parts by mass of a phenolic resin (C), and 0.5 to 2.0 parts by mass of a curing agent (D).

Advantageous Effects of Invention

The modified liquid diene rubbers according to the present invention are excellent in pumpability, dripping resistance, processability and reactivity, and are suitably used in the form of rubber compositions. Cured products obtained from such rubber compositions exhibit excellent rubber elasticity, mechanical characteristics (rigidity) and adhesion with respect to various substrates. Thus, the rubber compositions of the present invention may be suitably used as sealing materials, adhesives for bonding various parts, pressure sensitive adhesives, tire bead fillers, and the like.

DESCRIPTION OF EMBODIMENTS

[Modified Liquid Diene Rubbers (A)]

A modified liquid diene rubber (A) in the present invention is a liquid polymer which has a functional group (a) derived from an acid anhydride, and satisfies all the requirements (I) to (III) below:

(I) The functional group equivalent weight of the functional groups (a) is in the range of 400 to 3,500 g/eq.

(II) The polystyrene-equivalent number average molecular weight (Mn) measured by gel permeation chromatography (GPC) is in the range of 5,000 to 20,000.

(III) The melt viscosity at 38° C. is not less than 3 Pa·s and X (K) defined below is not less than 6100 K:

X is the slope of a linear line passing through two points in a graph in which the two points are values of melt viscosity η (Pa·s) at 38° C. and 60° C. measured with a Brookfield viscometer which are plotted as Ln[η/(Pa·s)] on the ordinate versus 1/T ($K^{-1}$) on the abscissa (with the proviso that T is temperature (K)).

A rubber composition which includes the above modified liquid diene rubber (A) and a solid rubber (B) described later exhibits excellent pumpability, dripping resistance, processability and reactivity, and gives cured products having excellent rubber elasticity, mechanical characteristics (rigidity) and adhesion with respect to various substrates. Here, the rubber elasticity may be represented by, for example, storage modulus. The reactivity used herein indicates the reactivity of functional groups. The high reactivity leads to excellent hardness and bond strength of cured products that are obtained.

For example, the modified liquid diene rubber (A) may be produced by adding a modifying agent which corresponds to the functional group (a) derived from an acid anhydride, to an unmodified liquid diene rubber (A').

The unmodified liquid diene rubber (A') that is the raw material for the modified liquid diene rubber (A) is preferably a polymer obtained by polymerizing a conjugated diene (a1) by a method described later. Examples of the conjugated dienes (a1) include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Of these conjugated dienes, butadiene and isoprene are preferable. The conjugated dienes may be used singly, or two or more may be used in combination.

The unmodified liquid diene rubber (A') may be a copolymer of the conjugated diene (a1) and an aromatic vinyl compound (a2). Examples of the aromatic vinyl compounds (a2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these aromatic vinyl compounds, styrene, α-methylstyrene and 4-methylstyrene are preferable.

From points of view such as the processability and adhesion of the composition, the proportion of the units from the aromatic vinyl compound (a2) relative to the total of the units from the conjugated diene (a1) and the aromatic vinyl compound (a2) in the unmodified liquid diene rubber (A') is preferably not more than 70 mass %, more preferably not more than 60 mass %, and still more preferably not more than 50 mass %.

The unmodified liquid diene rubber (A') may be produced by, for example, emulsion polymerization, solution polymerization or the like.

The emulsion polymerization may be performed by a process that is known or deemed as known. For example, predetermined amounts of monomers including a conjugated diene are emulsified and dispersed in the presence of an emulsifier, and are emulsion polymerized with a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

The dispersion medium is usually water and may include a water-soluble organic solvent such as methanol or ethanol as long as the stability during polymerization is not impaired.

Examples of the radical polymerization initiators include persulfate salts such as ammonium persulfate and potassium persulfate, organic peroxides and hydrogen peroxide.

A chain transfer agent may be used to control the molecular weight of the unmodified liquid diene rubber (A') that is obtained. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with factors such as the type of the radical polymerization initiator used, but is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the unmodified liquid diene rubber (A') is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the unmodified liquid diene rubber (A'). Next, the rubber is washed with water, then dehydrated and dried, thereby obtaining the unmodified liquid diene rubber (A'). During the coagulation process, the latex may be mixed together with an emulsified dispersion of an extender oil as required, and the unmodified liquid diene rubber (A') may be recovered as an oil-extended rubber.

The solution polymerization may be performed by a process that is known or deemed as known. For example, monomers including a conjugated diene are polymerized in a solvent using a Ziegler catalyst, a metallocene catalyst, or an active metal or active metal compound capable of catalyzing anionic polymerization, optionally in the presence of a polar compound.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium.

Among the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Among these organoalkali metal compounds, organolithium compounds are preferable, and organomonolithium compounds are more preferable.

The amount in which the organoalkali metal compound is used may be appropriately determined in accordance with factors such as the molecular weight and melt viscosity of the unmodified liquid diene rubber (A') and the modified liquid diene rubber (A), but is usually 0.01 to 3 parts by mass per 100 parts by mass of all the monomers including a conjugated diene.

The organoalkali metal compound may be used in the form of an organoalkali metal amide by being reacted with a secondary amine such as dibutylamine, dihexylamine or dibenzylamine.

Polar compounds are usually used in anionic polymerization to control the microstructure (for example, the vinyl content) of conjugated diene units without deactivating the reaction. Examples of the polar compounds include ether compounds such as dibutyl ether, tetrahydrofuran and ethylene glycol diethyl ether; tertiary amines such as N,N,N',N'-tetramethylethylenediamine and trimethylamine; alkali metal alkoxides and phosphine compounds. The polar compound is usually used in an amount of 0.01 to 1000 mol per mol of the organoalkali metal compound.

The temperature of the solution polymerization is usually in the range of −80 to 150° C., preferably in the range of 0 to 100° C., and more preferably in the range of 10 to 90° C. The polymerization mode may be batchwise or continuous.

The polymerization reaction may be terminated by the addition of a polymerization terminator. Examples of the polymerization terminators include alcohols such as methanol and isopropanol. The unmodified liquid diene rubber (A') may be isolated by pouring the polymerization reaction solution obtained into a poor solvent such as methanol to precipitate the unmodified liquid diene rubber (A'), or by washing the polymerization reaction solution with water, followed by separation and drying.

Among the above processes for the production of the unmodified liquid diene rubber (A'), the solution polymerization is preferable.

The unmodified liquid diene rubber (A') obtained as described above may be subjected to modification with functional groups described later directly (without being hydrogenated), or may be modified after the hydrogenation of at least part of the unsaturated bonds present in the liquid diene rubber.

The unmodified liquid diene rubber (A') is used in the form of a modified liquid diene rubber (A) after being modified with a functional group (a) derived from an acid anhydride. Examples of the functional groups derived from an acid anhydride include acid anhydride groups such as unsaturated carboxylic acid anhydride groups, and unsaturated carboxylate ester groups, unsaturated carboxylic acid amide groups and unsaturated carboxylic acid imide groups each derived from the acid anhydride groups described above.

The modified liquid diene rubber (A) may be produced by any method without limitation. For example, it may be produced by a graft reaction in which a compound that corresponds to the functional group (a) derived from an acid anhydride is added as a modifying agent to the unmodified liquid diene rubber (A').

Examples of the compounds corresponding to unsaturated carboxylic acid anhydride groups include unsaturated carboxylic acid anhydrides such as maleic anhydride and itaconic anhydride.

Examples of the compounds corresponding to unsaturated carboxylate ester groups include unsaturated carboxylate esters such as maleate esters, fumarate esters, itaconate esters, glycidyl (meth)acrylate and hydroxyethyl (meth)acrylate.

Examples of the compounds corresponding to unsaturated carboxylic acid amide groups include unsaturated carboxylic acid amides such as maleic acid amides, fumaric acid amides and itaconic acid amides.

Examples of the compounds corresponding to unsaturated carboxylic acid imide groups include unsaturated carboxylic acid imides such as maleic acid imides and itaconic acid imides.

In particular, the unmodified liquid diene rubber (A') is preferably modified by the addition of maleic anhydride as the modifying agent into a maleic anhydride-modified liquid diene rubber. This modification is advantageous from the point of view of economic efficiency and also to ensure that the rubber composition of the present invention and cross-linked products thereof will fully exhibit their characteristics. Maleic anhydride-modified liquid polybutadiene and maleic anhydride-modified liquid polyisoprene are more preferable, and maleic anhydride-modified liquid polyisoprene is more preferable.

The modifying agent may be introduced into the unmodified liquid diene rubber (A') by any method without limitation. For example, a method may be adopted in which a compound that corresponds to a functional group (a) derived from an acid anhydride, for example, an acid anhydride such as an unsaturated carboxylic acid anhydride, and optionally a radical catalyst are added to the unmodified liquid diene rubber, and the mixture is heated in the presence or absence of an organic solvent.

Examples of the organic solvents which are generally used in the above method include hydrocarbon solvents and halogenated hydrocarbon solvents. Of the organic solvents, hydrocarbon solvents such as n-butane, n-hexane, n-heptane, cyclohexane, benzene, toluene and xylene are preferable.

Examples of the radical catalysts used in the above method include di-s-butyl peroxydicarbonate, t-amyl peroxypivalate, t-amyl peroxy-2-ethylhexanoate and azobisisobutyronitrile. Of the radical catalysts, azobisisobutyronitrile is preferable.

Alternatively, an unsaturated carboxylic acid anhydride may be added to the unmodified liquid diene rubber (A') by the method described above to form an unsaturated carboxylic acid anhydride-modified liquid diene rubber, and the unsaturated carboxylic acid anhydride-modified liquid diene rubber may be reacted, for example, with water or an alcohol represented by $R^a$—OH (2) (wherein $R^a$ is a hydrogen atom or an optionally substituted alkyl group) or with ammonia or an amine represented by $R^b{}_2$—NH (3) (wherein $R^b$ at each occurrence is a hydrogen atom or an optionally substituted alkyl group and may be the same as or different from one another) to form an unsaturated carboxylate ester-modified liquid diene rubber, an unsaturated carboxylic acid amide-modified liquid diene rubber or an unsaturated carboxylic acid imide-modified liquid diene rubber that is used as the modified liquid diene rubber (A).

The compounds represented by the formula (2) and the formula (3) are not particularly limited. From points of view such as the ease of the modification reaction, alcohols having 1 to 20 carbon atoms are preferable, saturated alcohols having 1 to 20 carbon atoms are more preferable, and methanol, ethanol, propanol, butanol, 3-methylbutanol and 3-methyl-1,3-butanediol are still more preferable.

Further alternatively, the unsaturated carboxylic acid-modified liquid diene rubber may be reacted with a hydroxyl-containing (meth)acrylate as the compound of the formula (2) to give a (meth)acryloyl-modified liquid diene rubber, and this (meth)acryloyl-modified liquid diene rubber may be used as the modified liquid diene rubber (A). Examples of the hydroxyl-containing (meth)acrylates include 2-hydroxyethyl (meth)acrylate, 2-hydroxypropyl (meth)acrylate and 2-hydroxybutyl (meth)acrylate. Of these hydroxyl-containing (meth)acrylates, 2-hydroxyethyl (meth)acrylate is preferable.

The unsaturated carboxylic acid-modified liquid diene rubber may be reacted with one, or two or more kinds of the compounds represented by the formula (2) and the formula (3).

In the modified liquid diene rubber (A), the functional group equivalent weight of the functional groups (a) derived from an acid anhydride is in the range of 400 to 3,500 g/eq, preferably 600 to 2,500 g/eq, and more preferably 700 to 2,300 g/eq. By virtue of the functional group equivalent weight of the functional groups (a) derived from an acid anhydride being in this range, the modified liquid diene rubber (A) can give a composition which concurrently satisfies dripping resistance at room temperature and pumpability at a high temperature and which further exhibits excellent adhesion with respect to various substrates and high rigidity after being cured. In the present specification, the functional group equivalent weight of the functional groups (a) derived from an acid anhydride indicates the molecular weight of the modified liquid diene rubber (A) per functional group (a).

The modified liquid diene rubber (A) having a functional group equivalent weight of the functional groups (a) in the specified range may be effectively produced by performing the addition reaction of the modifying agent at an appropriate reaction temperature for a sufficient amount of reaction time. For example, maleic anhydride is preferably added to the unmodified liquid diene rubber (A') at a reaction temperature of 100 to 200° C., and more preferably 120° C. to 180° C. The reaction time is preferably 3 to 200 hours, more preferably 4 to 100 hours, and still more preferably 5 to 50 hours.

The functional group equivalent weight of the functional groups (a) introduced in the modified liquid diene rubber (A) may be calculated based on the ratio of the modifying agent that has undergone the addition reaction, or may be determined with various analyzers such as infrared spectrometry and nuclear magnetic resonance spectrometry.

The ratio of the modifying agent that has undergone the addition reaction into the modified liquid diene rubber (A) is preferably 40 to 100 mol %, more preferably 60 to 100 mol %, still more preferably 80 to 100 mol %, and further preferably 90 to 100 mol %. When the addition reaction ratio is in the above range, the modified liquid diene rubber (A) that is obtained contains small amounts of residues of the modifying agent and low-molecular compounds derived from the modifying agent, and thus it is possible to reduce the adverse effects caused by such compounds, for example, such adverse effects as corrosion of metals probably ascribed to acidic components such as maleic anhydride. When, for example, an unsaturated carboxylic acid or an unsaturated carboxylic acid derivative is used as the modifying agent, the ratio of the modifying agent that has undergone the addition reaction may be obtained by determining the amount of the unreacted modifying agent by, for example, comparing the acid values before and after washing of a sample of the modification reaction product.

The amount of the modifying agent added in the modified liquid diene rubber (A) is not limited in a strict sense. To ensure that a rubber composition that is obtained and crosslinked products thereof will fully exhibit their characteristics, however, the modification amount is preferably in the range of 0.05 to 40 parts by mass per 100 parts by mass of the unmodified polymer, and is more preferably in the range of 0.1 to 30 parts by mass, and still more preferably in the range of 0.1 to 20 parts by mass. If the amount of the modifying agent added is larger than 40 parts by mass, crosslinked products that are obtained tend to be lowered in flexibility and strength. If the amount is smaller than 0.05 parts by mass, crosslinked products that are obtained tend to exhibit lower adhesion.

The amount of the modifying agent added in the modified liquid diene rubber (A) may be calculated based on the addition reaction ratio of the modifying agent, or may be determined with various analyzers such as infrared spectrometry and nuclear magnetic resonance spectrometry.

In the modified liquid diene rubber (A), the functional groups may be introduced at polymer ends or polymer side chains. The functional groups that are contained may be of a single kind, or may be a mixture of two or more kinds of functional groups. Thus, the modified liquid diene rubber (A) may be a product of modification with a single modifying agent, or a product of modification with two or more kinds of modifying agents.

The number average molecular weight (Mn) of the modified liquid diene rubber (A) is 5,000 to 20,000, preferably 6,000 to 18,000, still more preferably 6,000 to 16,000, even more preferably 6,000 to 14,000, and further preferably 8,000 to 12,000. When the Mn of the modified liquid diene rubber (A) is in the above range, a composition that is obtained attains excellent molding properties and exhibits good rubber elasticity and rigidity after being cured. In the present invention, the Mn of the modified liquid diene rubber (A) is the polystyrene-equivalent number average molecular weight determined by gel permeation chromatography (GPC).

The molecular weight distribution (Mw/Mn) of the modified liquid diene rubber (A) is preferably 1.0 to 2.0, more preferably 1.0 to 1.5, still more preferably 1.0 to 1.2, and even more preferably 1.0 to 1.1. When the Mw/Mn is in this range, a composition that is obtained can concurrently satisfy dripping resistance at room temperature and pumpability at a high temperature, and further exhibits excellent molding properties and bleeds out no or a reduced amount of low-molecular components. The molecular weight distribution (Mw/Mn) is the ratio of weight average molecular weight (Mw) to number average molecular weight (Mn) measured by GPC relative to polystyrenes.

Some techniques for producing the modified liquid diene rubber (A) having the specified molecular weight distribution are to add an antioxidant during the addition reaction of the modifying agent described later, and to purify the unmodified liquid diene rubber (A') to sufficiently remove any components that will inhibit the addition reaction of the modifying agent. The purification method is preferably washing with water or warm water, an organic solvent such as methanol or acetone, or supercritical fluid carbon dioxide.

The modified liquid diene rubber (A) having the specified molecular weight distribution may be effectively synthesized involving the washing technique described above, and also by adding an antioxidant during the addition reaction of the modifying agent. Some preferred examples of the antioxidants used herein include phenolic antioxidants such as 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro [5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), hydroquinone and p-methoxyphenol; phosphorus antioxidants such as tris(2,4-di-t-butylphenyl) phosphite (Irgafos 168); amine antioxidants such as N-phenyl-N'-(1,3-dimethylbutyl)-p-phenylenediamine (NOCRAC 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057); sulfur antioxidants such as dioctadecyl 3,3'-dithiobispropionate, didodecyl-3,3'-thiodipropionate (Irganox PS800) and bis[3-(dodecylthio)propionic acid]-2, 2-bis[[3-(dodecylthio)-1-oxopropyloxy]methyl]-1,3-propanediyl (Sumilizer TP-D); and composite antioxidants formed of phenolic antioxidants and phosphorus antioxidants, such as 6-t-butyl-4-[3-(2,4,8,10-tetra-t-butyldibenzo [d,f][1,3,2]dioxaphosphepin-6-yloxy)propyl]-2-methylphenol (Sumilizer GP). The antioxidants may be used singly, or two or more may be used in combination.

The antioxidants, depending on the mechanisms in which they act, are classified into primary antioxidants which stop radical chain reactions, and secondary antioxidants which decompose peroxides. In order to synthesize the modified liquid diene rubber (A) with the specified molecular weight distribution in the present invention, phenolic antioxidants and amine antioxidants which act as the primary antioxidants are preferable from the point of view of suppressing side reactions which are induced by radicals generated during the addition reaction of the modifying agent. Amine antioxidants offer high antioxidant effects, although the modified liquid diene rubber (A) synthesized using this antioxidant can cause a coloration of a rubber composition. Thus, such a modified liquid diene rubber (A) is suitably used as a component in a tire bead filler rubber composition which will be described later. On the other hand, phenolic antioxidants, although comparing less favorably in antioxidant effects to amine antioxidants, are free from the coloration problem. Thus, the modified liquid diene rubber (A) synthesized by the addition of the modifying agent in the presence of a phenolic antioxidant is suitably used as a component other than in a tire bead filler rubber composition, for example, in a sealing rubber composition or an epoxy resin composition which will be described later.

The antioxidant is preferably added in an amount of 0.01 to 10 parts by mass, and more preferably 0.1 to 3 parts by mass per 100 parts by mass of the unmodified liquid diene rubber (A') or the modified liquid diene rubber (A).

Further, the modified liquid diene rubber (A) having the specified molecular weight distribution may be effectively synthesized also by appropriately controlling the temperature during the addition reaction of the modifying agent. For example, maleic anhydride may be preferably added to the unmodified liquid diene rubber (A') at a reaction temperature of 100 to 200° C., and more preferably 120° C. to 180° C.

The glass transition temperature (Tg) of the modified liquid diene rubber (A) is variable depending on factors such as the vinyl content in the units derived from the conjugated diene (a1), the type of the conjugated diene (a1) and the content of units derived from monomers other than conjugated dienes, but is preferably −100 to 30° C., more preferably −100 to 20° C., and still more preferably −100 to 10° C. When the Tg is in this range, for example, a rubber composition attains good processability and adhesion, and also exhibits a viscosity that is not excessively high and thus can be handled easily. The vinyl content in the modified liquid diene rubber (A) is preferably not more than 99 mol %, more preferably not more than 90 mol %, still more preferably not more than 50 mol %, even more preferably not more than 20 mol %, and particularly preferably not more than 10 mol %. The vinyl content in the modified liquid diene rubber (A) is preferably not less than 1 mol %, more preferably not less than 3 mol %, and still more preferably not less than 5 mol %. The modified liquid diene rubbers (A) may be used singly, or two or more may be used in combination. In the present invention, the "vinyl content" means the total molar percentage of 1,2-bonded or 3,4-bonded conjugated diene units (conjugated diene units except 1,4-bonded conjugated diene units) relative to the total of the conjugated diene (a1) units in the modified liquid diene rubber taken as 100 mol %. The vinyl content may be determined by $^1$H-NMR based on the area ratio of the peaks assigned to 1,2-bonded or 3,4-bonded conjugated diene units and the peak assigned to 1,4-bonded conjugated diene units.

The vinyl content in the modified liquid diene rubber (A) may be brought to the desired value by, for example, selecting the types of a solvent and an optional polar compound used in the production of the unmodified liquid diene rubber (A'), or controlling the production conditions such as polymerization temperature.

The melt viscosity of the modified liquid diene rubber (A) at 38° C. is not less than 3 Pa·s, preferably in the range of 3 to 200 Pa·s, more preferably in the range of 3 to 100 Pa·s, and still more preferably in the range of 5 to 50 Pa·s. By virtue of the melt viscosity of the modified liquid diene rubber (A) at 38° C. being in the above range, the modified liquid diene rubber (A) and a composition thereof attain good dripping resistance. The melt viscosity of the modified liquid diene rubber (A) at 60° C. is not particularly limited as long as the requirements in the present invention are satisfied, but is preferably not more than 25 Pa·s, more preferably not more than 20 Pa·s, and still more preferably not more than 10 Pa·s, and is preferably not less than 1.0 Pa·s, more preferably not less than 1.3 Pa·s, and still more preferably not less than 1.5 Pa·s. When the melt viscosity of the modified liquid diene rubber (A) at 60° C. is in the above range, the modified liquid diene rubber (A) and a composition thereof attain good pumpability. In the present invention, the melt viscosity of the modified liquid diene rubber (A) is a value determined by the method described later in EXAMPLES.

In the modified liquid diene rubber (A), X (K) is not less than 6100 K, preferably not less than 6200 K, and more preferably not less than 6400 K. Further, X (K) may be not more than 12000 K, preferably not more than 10000 K, more preferably not more than 9000 K, and still more preferably not more than 8000 K. Here, X (K) is the slope of a linear line passing through two points in a graph in which the two points are values of melt viscosity η (Pa·s) at 38° C. and 60° C. measured with a Brookfield viscometer which are plotted as $Ln[\eta/(Pa \cdot s)]$ on the ordinate versus $1/T$ $(K^{-1})$ on the abscissa.

In general, the temperature dependence of the viscosity of a fluid is known to obey the Andrade equation (1) below.

$$\eta = A \cdot \exp[T^{-1} \cdot E/R] \quad (1)$$

In the equation (1), η denotes the melt viscosity (Pa·s) at a temperature T (K), R the gas constant $(J \cdot K^{-1} \cdot mol^{-1})$, E the viscous flow activation energy $(J \cdot mol^{-1})$, and A a constant (Pa·s).

X (K) in the present invention can be regarded as an approximation of E/R in the above equation (1). This E/R is the quotient of the apparent activation energy required for fluidization, divided by the gas constant. By virtue of X (K) in the present invention being in the above range, the melt viscosity significantly changes depending on temperatures to make it possible to design the modified liquid diene rubber (A) or a composition thereof so as to concurrently satisfy dripping resistance at room temperature and fluidity at a high temperature.

[Rubber Compositions]

A rubber composition of the present invention includes the modified liquid diene rubber (A) described hereinabove as a rubber component. The rubber components in the present invention include the modified liquid diene rubber, and further include as required an optional unmodified liquid diene rubber and an optional solid rubber (B) described below. For example, the rubber components in the rubber composition of the present invention may only include liquid diene rubbers including the modified liquid diene rubber (A) described hereinabove, or may include the modified liquid diene rubber (A) and a solid rubber (B) described below.

When the solid rubber (B) is contained as a rubber component, the rubber components may include 1 to 99 mass % of the liquid diene rubber (A) and 99 to 1 mass % of the solid rubber (B), and preferably include 1 to 95 mass % of the liquid diene rubber (A) and 99 to 5 mass % of the solid rubber (B), more preferably 10 to 90 mass % of the liquid diene rubber (A) and 90 to 10 mass % of the solid rubber (B), and still more preferably 20 to 80 mass % of the liquid diene rubber (A) and 80 to 20 mass % of the solid rubber (B). By virtue of the proportions of the liquid diene rubber (A) and the solid rubber (B) being in the above range, the rubber composition attains good processability and adhesion.

[Solid Rubbers (B)]

The solid rubber (B) used in the rubber composition of the invention is a rubber that can be handled as a solid at 20° C. The Mooney viscosity $ML_{1+4}$ of the solid rubber (B) at 100° C. is usually in the range of 20 to 200. Examples of the solid rubbers (B) include natural rubbers, polyisoprene rubbers, polybutadiene rubbers, styrene-butadiene copolymer rubbers, styrene-isoprene copolymer rubbers, acrylonitrile-butadiene copolymer rubbers, chloroprene rubbers, ethylene-propylene rubbers and butyl rubbers.

To ensure that the rubber composition that is obtained will fully exhibit its characteristics, the weight average molecular weight (Mw) of the solid rubber (B) is preferably not less than 80,000, and more preferably in the range of 100,000 to 3,000,000.

In the present specification, the weight average molecular weight is the polystyrene-equivalent weight average molecular weight measured by gel permeation chromatography (GPC).

Examples of the natural rubbers include those natural rubbers, high-purity natural rubbers and modified natural rubbers such as epoxidized natural rubbers, hydroxylated natural rubbers, hydrogenated natural rubbers and grafted natural rubbers which are generally used in the tire industry, with specific examples including TSRs such as SMRs, SIRs and STRs, and RSSs. In particular, SMR 20, STR 20 and RSS #3 are preferable from the points of view of uniform quality and high availability. The natural rubbers may be used singly, or two or more may be used in combination.

Examples of the polyisoprene rubbers include commercially available polyisoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to solution-polymerized styrene-butadiene copolymer rubbers (hereinafter, also written as S-SBRs). Ziegler-catalyzed polyisoprene rubbers are preferable because they have a high cis content. Use may be made of ultrahigh-cis polyisoprene rubbers obtained using lanthanoid rare earth metal catalysts.

The vinyl content in the polyisoprene rubbers is preferably not more than 50 mass %, more preferably not more than 40 mass %, and still more preferably not more than 30 mass %. If the vinyl content exceeds 50 mass %, the rubber composition tends to be deteriorated in flexibility at low temperatures. The lower limit of the vinyl content is not particularly limited. The glass transition temperature, although variable depending on the vinyl content, is preferably not more than −20° C., and more preferably not more than −30° C.

The weight average molecular weight (Mw) of the polyisoprene rubbers is preferably 90,000 to 2,000,000, and more preferably 150,000 to 1,500,000. When the Mw is in this range, good processability and high mechanical strength are obtained.

As long as the advantageous effects of the invention are not impaired, the polyisoprene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the polybutadiene rubbers include commercially available polybutadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to S-SBRs. Ziegler-catalyzed polybutadiene rubbers are preferable because they have a high cis content. Use may be made of ultrahigh-cis polybutadiene rubbers obtained using lanthanoid rare earth metal catalysts.

The vinyl content in the polybutadiene rubbers is preferably not more than 50 mass %, more preferably not more than 40 mass %, and still more preferably not more than 30 mass %. If the vinyl content exceeds 50 mass %, the rubber composition tends to be deteriorated in flexibility at low temperatures. The lower limit of the vinyl content is not particularly limited. The glass transition temperature, although variable depending on the vinyl content, is preferably not more than −40° C., and more preferably not more than −50° C.

The weight average molecular weight (Mw) of the polybutadiene rubbers is preferably 90,000 to 2,000,000, and more preferably 150,000 to 1,500,000. When the Mw is in this range, good processability and high mechanical strength are obtained.

As long as the advantageous effects of the invention are not impaired, the polybutadiene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Any styrene-butadiene copolymer rubbers (hereinafter, also written as SBRs) may be used appropriately in accordance with factors such as use applications. Specifically, those having a styrene content of 0.1 to 70 mass % are preferable, and the styrene content is more preferably 5 to 50 mass %, and still more preferably 10 to 40 mass %. Further, those rubbers having a vinyl content of 0.1 to 60 mass % are preferable, and those having a vinyl content of 0.1 to 55 mass % are more preferable.

The weight average molecular weight (Mw) of the SBRs is preferably 100,000 to 2,500,000, more preferably 150,000 to 2,000,000, and still more preferably 200,000 to 1,500,000. When the weight average molecular weight is in this range, processability and mechanical strength can be satisfied concurrently.

The glass transition temperature of the SBRs used in the present invention, as measured by differential thermal analysis, is preferably −95 to 0° C., and more preferably −95 to −5° C. When the glass transition temperature is in this range, the material exhibits a viscosity that is not excessively high and thus can be handled easily.

SBR which may be used in the invention may be obtained by copolymerizing styrene and butadiene. The SBR production process is not particularly limited and may be any of emulsion polymerization, solution polymerization, gas-phase polymerization and bulk polymerization. Of these production processes, emulsion polymerization and solution polymerization are preferable.

An emulsion-polymerized styrene-butadiene copolymer rubber (hereinafter, also written as E-SBR) may be produced by a usual emulsion polymerization process that is known or is deemed as known. For example, such a rubber may be obtained by emulsifying and dispersing predetermined amounts of styrene and butadiene monomers in the presence of an emulsifier and emulsion polymerizing the monomers with a radical polymerization initiator.

S-SBR may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline-earth metals such as beryllium, magnesium, calcium, strontium and barium; and lanthanoid rare earth metals such as lanthanum and neodymium. Of these active metals, alkali metals and alkaline-earth metals are preferable, and alkali metals are more preferable. Of the alkali metals, organoalkali metal compounds are more preferably used.

Examples of the organoalkali metal compounds include organomonolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compounds are used may be determined appropriately in accordance with the desired molecular weight of S-SBR.

The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene moieties and controlling the distribution of styrene in copolymer chains. Examples include ether compounds such as dibutyl ether, tetrahydrofuran and ethylene glycol diethyl ether; tertiary amines such as tetramethylethylenediamine and trimethylamine; alkali metal alkoxides and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific compositional ratio.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of the modifying agents described in JP-A-2011-132298.

In the modified SBR, the functional groups may be introduced at polymer ends or polymer side chains.

The styrene-isoprene copolymer rubbers, the acrylonitrile-butadiene copolymer rubbers, the chloroprene rubbers, the ethylene propylene rubbers (such as EPMs and EPDMs), and the butyl rubbers may be commercial products without limitation.

[Fillers]

The rubber composition of the present invention may include a filler. Fillers may be added for purposes such as to enhance the mechanical strength, to improve properties such as heat resistance or weather resistance, to control the hardness, and to increase the bulk of rubber. Examples of the fillers include inorganic fillers such as calcium carbonate, calcium oxide, magnesium hydroxide, magnesium oxide, magnesium carbonate, aluminum hydroxide, barium sulfate, barium oxide, titanium oxide, iron oxide, zinc oxide, zinc carbonate, clays including pyrophillite clay, kaolin clay and calcined clay, mica, diatomaceous earth, carbon black, silica, glass fibers, carbon fibers, fibrous fillers and glass balloons, resin particles and synthetic fibers formed of resins such as crosslinked polyesters, polystyrenes, styrene-acrylic copolymer resins and urea resins, and natural fibers.

When the filler is particles, the shape of the particles may be selected from various shapes such as spheres in accordance with factors such as desired properties. When the filler is particles, the particles may be solid particles, hollow particles, or core-shell particles composed of a plurality of materials or the like, in accordance with factors such as desired properties. The surface of the fillers may be treated with various compounds such as fatty acids, resin acids, fatty acid esters and silane coupling agents.

Of the fillers, calcium carbonate, carbon black and silica are preferable from points of view such as reinforcement of the rubber composition that is obtained and crosslinked products thereof, prices and handleability. Calcium carbonate and carbon black are more preferable. The fillers may be used singly, or two or more may be used in combination.

In the rubber composition of the present invention, the content of the filler per 100 parts by mass of the rubber component is preferably 0.1 to 1500 parts by mass, more preferably 1 to 1300 parts by mass, still more preferably 5 to 1000 parts by mass, and even more preferably 10 to 800 parts by mass.

When the rubber composition of the invention includes the modified liquid diene rubber (A) and the solid rubber (B) as rubber components, the content of the filler per 100 parts by mass of the rubber components including the modified liquid diene rubber (A) and the solid rubber (B) is preferably 0.1 to 1500 parts by mass, more preferably 1 to 1300 parts by mass, still more preferably 5 to 1000 parts by mass, and even more preferably 10 to 800 parts by mass. When the content of the filler is in the above range, the rubber composition exhibits good processability and high adhesion.

[Oils]

The rubber composition of the present invention may include an oil. Oils may be added mainly to enhance the processability of the rubber composition of the invention, to enhance the dispersibility of other ingredients, and to control the characteristics of the rubber composition to desired ranges. Examples of the oils include mineral oils, vegetable oils and synthetic oils.

Examples of the mineral oils include paraffinic oils, naphthenic oils and aromatic oils. Examples of the vegetable oils include castor oils, cottonseed oils, linseed oils, rapeseed oils, soybean oils, palm oils, coconut oils and peanut oils. Examples of the synthetic oils include ethylene-α-olefin oligomers and liquid paraffins.

Of the oils, paraffinic oils, naphthenic oils and aromatic oils are preferable, and naphthenic oils are more preferable.

The oils may be used singly, or two or more may be used in combination.

In the rubber composition of the present invention, the content of the oil per 100 parts by mass of the rubber component is preferably 0.1 to 500 parts by mass, more preferably 1 to 450 parts by mass, still more preferably 5 to 400 parts by mass, and even more preferably 8 to 350 parts by mass.

When the rubber composition of the invention includes the modified liquid diene rubber (A) and the solid rubber (B) as rubber components, the content of the oil per 100 parts by mass of the rubber components including the modified liquid diene rubber (A) and the solid rubber (B) is preferably 0.1 to 500 parts by mass, more preferably 1 to 450 parts by mass, still more preferably 5 to 400 parts by mass, and even more preferably 8 to 350 parts by mass. When the content of the oil is in the above range, the rubber composition exhibits good processability and high adhesion.

[Other Components]

The rubber composition of the present invention may further include a crosslinking agent for crosslinking the rubber components. Examples of the crosslinking agents include sulfur, sulfur compounds, oxygen, organic peroxides, phenolic resins, amino resins, quinone and quinone dioxime derivatives, halogen compounds, aldehyde compounds, alcohol compounds, epoxy compounds, metal halides and organometal halides, and silane compounds. Examples of the sulfur compounds include morpholine disulfides and alkylphenol disulfides. Examples of the organic peroxides include cyclohexanone peroxide, methyl acetoacetate peroxide, t-butyl peroxyisobutyrate, t-butyl peroxybenzoate, benzoyl peroxide, lauroyl peroxide, dicumyl peroxide, di-t-butyl peroxide and 1,3-bis(t-butylperoxyisopropyl)benzene. The crosslinking agents may be used singly, or two or more may be used in combination.

The content of the crosslinking agent is usually 0.1 to 10 parts by mass, preferably 0.5 to 10 parts by mass, and more preferably 0.8 to 10 parts by mass per 100 parts by mass of the rubber component in the rubber composition.

When the rubber components include the modified liquid diene rubber (A) and the solid rubber (B), the content of the crosslinking agent, from the point of view of the mechanical properties of crosslinked products, is usually 0.1 to 10 parts by mass, preferably 0.5 to 10 parts by mass, and more preferably 0.8 to 10 parts by mass per 100 parts by mass of the rubber components including the solid rubber (B) and the modified liquid diene rubber (A).

When, for example, the crosslinking agent for crosslinking (vulcanizing) the rubber is sulfur, a sulfur compound or the like, the rubber composition of the present invention may further contain a vulcanization accelerator. Examples of the vulcanization accelerators include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators may be used singly, or two or more may be used in combination.

The content of the vulcanization accelerator is usually 0.1 to 15 parts by mass, and preferably 0.1 to 10 parts by mass per 100 parts by mass of the rubber component in the rubber components.

When the rubber components include the modified liquid diene rubber (A) and the solid rubber (B), the content of the vulcanization accelerator is usually 0.1 to 15 parts by mass, and preferably 0.1 to 10 parts by mass per 100 parts by mass of the rubber components including the solid rubber (B) and the modified liquid diene rubber (A).

When, for example, the crosslinking agent for crosslinking (vulcanizing) the rubber is sulfur, a sulfur compound or the like, the rubber composition of the present invention may further contain a vulcanization aid. Examples of the vulcanization aids include fatty acids such as stearic acid, metal oxides such as zinc oxide, and fatty acid metal salts such as zinc stearate. The vulcanization aids may be used singly, or two or more may be used in combination.

The content of the vulcanization aid is usually 0.1 to 15 parts by mass, and preferably 0.5 to 10 parts by mass per 100 parts by mass of the rubber component in the rubber composition.

When the rubber components include the modified liquid diene rubber (A) and the solid rubber (B), the content of the vulcanization aid is usually 0.1 to 15 parts by mass, and preferably 0.5 to 10 parts by mass per 100 parts by mass of the rubber components including the solid rubber (B) and the modified liquid diene rubber (A).

The rubber composition of the invention may be designed to be crosslinked with other crosslinker or the like in place of or in addition to the above crosslinking agent, the optional vulcanization accelerator and the optional vulcanization aid.

Examples of such crosslinkers and other agents for crosslinking the rubber composition of the invention include combinations of a phenolic resin (C) and a curing agent (D), and combinations of an epoxy resin and a tertiary amine.

A combination of a phenolic resin (C) and a curing agent (D) is suitably used when the composition is a tire bead filler rubber composition. The phenolic resins (C) and the curing agents (D) will be described in detail in the description of tire bead filler rubber compositions.

A combination of an epoxy resin and a tertiary amine is suitably used when the composition is a sealing rubber composition. The epoxy resins and the tertiary amines will be described in detail in the description of sealing materials.

For the purpose of improving properties such as processability and fluidity, the rubber composition of the invention may contain tackifying resins as required such as aliphatic hydrocarbon resins, alicyclic hydrocarbon resins, C9 resins, rosin resins, coumarone-indene resins and phenolic resins, without impairing the advantageous effects of the invention.

For the purpose of enhancing properties such as weather resistance, heat resistance and oxidation resistance, the rubber composition of the invention may contain additives as required while still achieving the advantageous effects of the invention. Examples of such additives include antioxidants, oxidation inhibitors, light stabilizers, scorch inhibitors, functional group-containing compounds, waxes, lubricants, plasticizers, processing aids, pigments, coloring matters, dyes, other colorants, flame retardants, antistatic agents, matting agents, antiblocking agents, UV absorbers, release agents, foaming agents, antibacterial agents, mildewproofing agents, perfumes, dispersants and solvents.

Examples of the oxidation inhibitors include hindered phenol compounds, phosphorus compounds, lactone compounds and hydroxyl compounds.

Examples of the antioxidants include amine-ketone compounds, imidazole compounds, amine compounds, phenolic compounds, sulfur compounds and phosphorus compounds.

Functional group-containing compounds may be added for purposes such as to enhance, for example, the adhesion and adhesiveness of the rubber composition with respect to adherends. Examples of the functional group-containing compounds include functional group-containing alkoxysilanes such as N-β-(aminoethyl)-γ-aminopropyltrimethoxysilane and γ-glycidoxypropyltrimethoxysilane, and functional group-containing acrylates and methacrylates such as 2-hydroxyethyl acryloyl phosphate, 2-hydroxyethyl methacryloyl phosphate, nitrogen-containing acrylate and nitrogen-containing methacrylate. From the points of view of adhesion and adhesiveness, the functional group in a preferred embodiment is an epoxy group.

Examples of the pigments include inorganic pigments such as titanium dioxide, zinc oxide, ultramarine, red iron oxide, lithopone, lead, cadmium, iron, cobalt, aluminum, hydrochloride salts and sulfate salts; and organic pigments such as azo pigments and copper phthalocyanine pigments.

Examples of the antistatic agents include hydrophilic compounds such as quaternary ammonium salts, polyglycols and ethylene oxide derivatives.

Examples of the flame retardants include chloroalkyl phosphates, dimethyl-methyl phosphonate, bromine-phosphorus compounds, ammonium polyphosphates, neopentyl bromide polyethers and brominated polyethers. The additives may be used singly, or two or more may be used in combination.

[Methods for Producing Rubber Compositions]

The rubber composition of the invention may be produced by any methods without limitation as long as the components described hereinabove can be mixed together homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The mixing may be performed at atmospheric pressure in an air atmosphere, but is preferably carried out at a reduced pressure or in a nitrogen atmosphere to prevent trapping of air into the composition during the mixing. The rubber composition of the invention obtained by uniformly dispersing the components is preferably stored in a container such as a hermetic container until actual use.

[Tire Bead Filler Rubber Compositions]

In a preferred embodiment, the rubber composition of the present invention is used as a tire bead filler rubber composition. The tire bead filler rubber composition preferably includes a phenolic resin (C) and a curing agent (D) in addition to the modified liquid diene rubber (A) and the solid rubber (B).

Examples of the phenolic resins (C) used in the tire bead filler rubber composition of the present invention include novolak phenol resins. Examples of the novolak phenol resins include phenol-formaldehyde resins, resorcin-formaldehyde resins and cresol resins. Such novolak phenol resins may be modified with modifiers such as rosin oil, tall oil, cashew oil, linoleic acid, oleic acid and linolenic acid, or may be modified with aromatic hydrocarbons such as xylene and mesitylene, or may be modified with rubbers such as nitrile rubber.

Examples of the curing agents (D) used in the tire bead filler rubber composition of the present invention include hexamethylenetetramine and hexamethoxymethylmelamine. In particular, hexamethylenetetramine is preferable.

When the rubber composition of the invention is used as a tire bead filler rubber composition, the content of the modified liquid diene rubber (A) is preferably 1 to 20 parts by mass, more preferably 3 to 15 parts by mass, and still more preferably 4 to 12 parts by mass per 100 parts by mass of the solid rubber (B) from the points of view of molding properties, and rigidity and strength after vulcanization. If the content is less than 1 part by mass, molding properties and rigidity after vulcanization may be insufficient. If the content is more than 20 parts by mass, the mechanical strength of vulcanized products is sometimes decreased.

When the rubber composition of the invention is used as a tire bead filler rubber composition, the content of the phenolic resin (C) is preferably 5 to 40 parts by mass, and more preferably 15 to 25 parts by mass per 100 parts by mass of the solid rubber (B) from the point of view of hardness and toughness after vulcanization. If the content is less than 5 parts by mass, the hardness after vulcanization is decreased and the rigidity may be deteriorated. If the content is more than 40 parts by mass, vulcanized products lose toughness and may be brittle.

When the rubber composition of the invention is used as a tire bead filler rubber composition, the content of the curing agent (D) is preferably 0.5 to 2.0 parts by mass per 100 parts by mass of the solid rubber (B) from the points of view of hardness after vulcanization and fuel efficiency. If the content is less than 0.5 parts by mass, the hardness after vulcanization is decreased and the rigidity may be deteriorated. If the content is more than 2.0 parts by mass, the energy loss at the time of deformation is increased and the fuel efficiency is sometimes decreased.

When the rubber composition of the invention is used as a tire bead filler rubber composition, the composition may include, in addition to the components described hereinabove, other optional components (for example, carbon blacks, vulcanizing agents, crosslinking agents, vulcanization accelerators, oils, processing aids, plasticizers and antioxidants) which may be added to the rubber composition of the present invention.

[Sealing Materials]

In a preferred embodiment, the rubber composition of the invention is used as a sealing rubber composition for forming a sealing material. The sealing material is preferably a crosslinked product described later. The sealing rubber composition includes the modified liquid diene rubber (A) and optionally the solid rubber (B), and preferably further includes components such as a crosslinking agent described hereinabove. The sealing rubber composition may include a combination of an epoxy resin and a tertiary amine in place of or in addition to the crosslinking agent or the like described hereinabove.

Examples of the epoxy resins include biphenyl epoxy resins, naphthalene epoxy resins, diphenyl ether epoxy resins, diphenyl thioether epoxy resins, hydroquinone epoxy resins, biphenyl novolak epoxy resins, cresol novolak epoxy resins, phenol novolak epoxy resins, bisphenol A novolak epoxy resins, trisphenol epoxy resins, tetraphenylolethane epoxy resins, dicyclopentadiene epoxy resins, bisphenol A epoxy resins and bisphenol F epoxy resins.

Examples of the tertiary amines include triethylamine, benzyldimethylamine, 2-(dimethylaminomethyl)phenol and 2,4,6-tris(dimethylaminomethyl)phenol.

[Crosslinked Products]

A crosslinked product may be obtained by applying the rubber composition of the invention as required to a surface such as a substrate, for example, an oil-coated steel plate, and crosslinking the composition. The rubber composition may be crosslinked under conditions selected appropriately in accordance with factors such as use applications. For example, a crosslinked product may be produced by performing the crosslinking reaction at a temperature in the range of 130° C. to 250° C. for 10 minutes to 60 minutes. When, for example, the rubber composition of the invention is used on automobile manufacturing lines, the rubber composition of the invention may be applied to desired portions of various members (for example, into gaps between flanges of a plurality of frame members), and may be thereafter crosslinked by heat which is generated during the baking and drying of automobile bodies in the electrodeposition coating step, thereby forming crosslinked products at the desired portions.

The crosslinked products obtained from the rubber composition of the invention are excellent in adhesion and may be suitably used for articles such as, for example, automobile parts.

[Curable Resin Compositions]

The modified liquid diene rubber (A) of the present invention may be used together with a curable resin (E) as components of a curable resin composition.

The curable resin (E) for use in the curable resin composition may be selected appropriately in accordance with factors such as use applications. Generally, the curable resin (E) includes a curable compound with a relatively low molecular weight, a curable oligomer, or a mixture thereof. The curable resin (E) is caused to undergo a curing reaction by the action of heat, light, a catalyst or the like to form a three-dimensional network structure.

Examples of the curable resins (E) include epoxy resins, unsaturated polyester resins, epoxy (meth)acrylate resins, ester (meth)acrylate resins, phenolic resins, urea resins, melamine resins, urethane resins, silicon resins, imide resins, furan resins, alkyd resins, allyl resins and diallyl phthalate resins.

Examples of the epoxy resins include biphenyl epoxy resins, naphthalene epoxy resins, diphenyl ether epoxy resins, diphenyl thioether epoxy resins, hydroquinone epoxy resins, biphenyl novolak epoxy resins, cresol novolak epoxy resins, phenol novolak epoxy resins, bisphenol A novolak epoxy resins, trisphenol epoxy resins, tetraphenylolethane epoxy resins, dicyclopentadiene epoxy resins, bisphenol A epoxy resins and bisphenol F epoxy resins. The epoxy resins may be used singly, or two or more may be used in combination.

Examples of the unsaturated polyester resins include Ortho unsaturated polyester resins, Iso unsaturated polyester resins and bisphenol unsaturated polyester resins. The unsaturated polyester resins may be used singly, or two or more may be used in combination.

Of the curable resins (E) described above, epoxy resins and unsaturated polyester resins are preferable from points of view such as availability and basic properties of cured products, and epoxy resins are more preferable.

In the curable resin composition (for example, an epoxy resin composition including an epoxy resin as the curable resin (E)), the content of the modified liquid diene rubber (A) per 100 parts by mass of the curable resin (E) is preferably 1 to 20 parts by mass from the points of view of molding properties, and heat resistance, strength and impact resistance after curing, and is more preferably 3 to 15 parts by mass, and still more preferably 4 to 12 parts by mass. If the content is less than 1 part by mass, molding properties and impact resistance after curing may be insufficient. If the content is more than 20 parts by mass, the mechanical strength of cured products is sometimes decreased.

The curable resin composition may further include a resin curing agent (F) capable of curing the curable resin (E). When, for example, the curable resin (E) is an epoxy resin, the curing agent may be an epoxy curing agent, for example, a polyaddition-type epoxy curing agent such as aliphatic polyamine, alicyclic polyamine, aromatic polyamine, acid anhydride compound or phenol novolak resin; or a catalyst-type epoxy curing agent such as aromatic tertiary amine, imidazole compound (e.g., 2-ethyl-4-methylimidazole) or Lewis acid complex.

In the curable resin composition, the content of the resin curing agent (F) per 100 parts by mass of the curable resin (E) is preferably 0.5 to 5.0 parts by mass from the points of view of the curing rate and properties of cured products. If the content is less than 0.5 parts by mass, the curing rate is insufficient, and properties of cured products such as heat resistance and strength may be deteriorated. If the content is more than 5.0 parts by mass, properties of cured products of the curable resin composition may be adversely affected.

In addition to the components described above, the curable composition may include additional components such as those mentioned hereinabove as optional components in the rubber composition of the present invention, namely, fillers; and additives such as antioxidants, oxidation inhibitors, light stabilizers, functional group-containing compounds, waxes, lubricants, plasticizers, processing aids, pigments, coloring matters, dyes, other colorants, flame retardants, antistatic agents, matting agents, antiblocking agents, UV absorbers, release agents, foaming agents, antibacterial agents, mildew-proofing agents, perfumes, dispersants and solvents.

The curable resin composition may be prepared using any technique as long as the curable resin (E), the modified liquid diene rubber (A) and optional components such as the resin curing agent (F) can be mixed together uniformly. For example, predetermined amounts of the materials may be mixed together sufficiently in a device such as a mixer, and the mixture may be melt kneaded with a device such as a mixing roll or an extruder, and may be thereafter cooled and crushed.

The curable composition may give a cured product by causing the curable resin (E) to cure in an appropriate manner. When, for example, the curable resin (E) is curable by heat, the curing may be performed for an appropriate amount of time at a selected temperature suited for the curable resin composition including the curable resin (E). In this case in which the curable resin composition is cured by heat, a cured product may be fabricated by a molding method such as, for example, transfer molding, injection molding or compression molding.

The curable resin composition can give cured products which are excellent in, for example, heat resistance, impact resistance and mechanical characteristics. Thus, the curable resin composition and cured products obtained from the composition may be used in various applications. For example, the curable resin composition and the cured products may be used in fields such as electrical and electronic fields, construction and civil engineering fields, and transportation and carriage fields (automobile field, etc.). More specific examples of the applications include various types of adhesives such as adhesives for fiber-reinforced composite materials (e.g., adhesives for fiber-reinforced composite materials for concretes, adhesives for fiber-reinforced composite materials for transportation and carriage machines such as automobiles, railway vehicles and aircraft, and adhesives for fiber-reinforced composite materials for various sporting goods), and adhesives for assembling (e.g., adhesives for assembling of parts of transportation and carriage machines such as automobiles, railway vehicles and aircraft); various types of paints such as anticorrosive and waterproof paints for water and sewerage systems, and anticorrosive paints for metals; various types of paint primers such as paint primers for construction and civil engineering, and paint primers for transportation and carriage machines such as automobiles, railway vehicles and aircraft; various types of lining materials such as lining materials for metals, lining materials for concretes, and lining materials for tanks; various types of repair materials such as concrete crack repair materials; and various types of electrical and electronic parts such as printed wiring boards, insulating boards, semiconductor sealing materials and packaging materials.

EXAMPLES

The present invention will be described in further detail by presenting Examples hereinbelow. However, it should be construed that the scope of the invention is not limited to such Examples.

The following are the components used in Examples and Comparative Examples.

<Modified Liquid Diene Rubbers (A)>

Modified liquid diene rubbers obtained in Production Examples 1 to 4 described later <Diene Rubbers>

Synthetic isoprene rubber: IR-2200 (manufactured by JSR Corporation)

(Modified) liquid diene rubbers obtained in Comparative Production Examples 1 to 4 described later <Solid Rubbers (B)>

Natural rubber: STR20

Polybutadiene rubber: Diene NF35R (manufactured by Asahi Kasei Corporation)

<Phenolic Resin (C)>

Solid novolak resin: PR12686 (manufactured by Sumitomo Bakelite Co., Ltd.)

<Curing Agent (D)>

Hexamethylenetetramine: Nocceler H (manufactured by Ouchi Shinko Chemical Industrial Co., Ltd.)

<Optional Components>

Oil (TDAE): VivaTec 500 (manufactured by H&R)

Naphthenic oil: SUNTHENE 250 (manufactured by JAPAN SUN OIL COMPANY, LTD.)

Carbon black: DIABLACK H (manufactured by Mitsubishi Chemical Corporation)

Calcium carbonate: Hakuenka CCR (manufactured by SHIRAISHI CALCIUM KAISHA, LTD.)

Sulfur (1): MUCRON OT-20 (manufactured by SHIKOKU CHEMICALS CORPORATION)

Sulfur (2): Sulfur fine powder 200 mesh (manufactured by Tsurumi Chemical Industry Co., Ltd.)

Vulcanization accelerator (1): Sanceler NS-G (manufactured by SANSHIN CHEMICAL INDUSTRY CO., LTD.)

Vulcanization accelerator (2): Nocceler DM (manufactured by Ouchi Shinko Chemical Industrial Co., Ltd.)

Vulcanization accelerator (3): Nocceler BG (manufactured by Ouchi Shinko Chemical Industrial Co., Ltd.)

Zinc oxide: Zinc oxide (manufactured by Sakai Chemical Industry Co., Ltd.)

Stearic acid: LUNAC S-20 (manufactured by Kao Corporation)

Antioxidant (1): Nocrac 6C (manufactured by Ouchi Shinko Chemical Industrial Co., Ltd.)

Antioxidant (2): ANTAGE RD (manufactured by Kawaguchi Chemical Industry Co., LTD.)

Antioxidant (3): Nocrac NS-6 (manufactured by Ouchi Shinko Chemical Industrial Co., Ltd.)

Terpene resin: YS resin Px800 (manufactured by YASUHARA CHEMICAL CO., LTD.)

Epoxy resin (1): Araldite GY-260 (manufactured by Huntsman Japan KK)

Epoxy resin (2): jER828 (manufactured by Mitsubishi Chemical Corporation)

Tertiary amine: Ancamine K-54 (manufactured by Evonik Degussa Japan)

Epoxy curing agent: CUREZOL 2E4MZ (manufactured by SHIKOKU CHEMICALS CORPORATION)

Comparative Production Example 1: Liquid Polyisoprene (A'-1)

A thoroughly dried pressure-resistant container was purged with nitrogen. The pressure-resistant container was then loaded with 600 g of cyclohexane and 212 g of sec-butyllithium (a 10.5 mass % cyclohexane solution). The temperature was increased to 70° C. While performing stirring, 2050 g of isoprene was added, and the polymerization was performed for 1 hour while controlling the polymerization temperature at 70° C. The polymerization reaction was then terminated by the addition of methanol. A polymer solution (2862 g) was thus obtained. Water was added to the polymerization solution, and the mixture was stirred to wash the polymerization solution with water. The stirring was terminated. After the liquid had separated into the polymer solution phase and the aqueous phase, the water was removed. After the completion of washing, the polymerization solution was dried at 70° C. for 12 hours to afford a liquid polyisoprene (hereinafter, also written as the "polymer (A'-1)").

Production Example 1: Maleic Anhydride-Modified Liquid Polyisoprene (A-1)

5 Parts by mass of maleic anhydride and 0.1 part by mass of BHT (2,6-di-t-butyl-4-methylphenol, manufactured by Honshu Chemical Industry Co., Ltd.) were added to 100 parts by mass of the polymer (A'-1), and the mixture was reacted at 160° C. for 20 hours to give a maleic anhydride-modified liquid polyisoprene (A-1) (hereinafter, also written as the "polymer (A-1)"). The reaction ratio of maleic anhydride was determined by acid value titration to be at least 99%, and the equivalent weight of functional groups (a) derived from the acid anhydride in the polymer (A-1) was 2,100 g/eq.

Production Example 2: Maleic Anhydride-Modified Liquid Polyisoprene (A-2)

10 Parts by mass of maleic anhydride and 0.1 part by mass of BHT (2,6-di-t-butyl-4-methylphenol, manufactured by Honshu Chemical Industry Co., Ltd.) were added to 100 parts by mass of the polymer (A'-1), and the mixture was reacted at 160° C. for 20 hours to give a maleic anhydride-modified liquid polyisoprene (A-2) (hereinafter, also written as the "polymer (A-2)"). The reaction ratio of maleic anhydride was determined by acid value titration to be at least 99%, and the equivalent weight of functional groups (a) derived from the acid anhydride in the polymer (A-2) was 1,100 g/eq.

Production Example 3: Maleic Anhydride-Modified Liquid Polyisoprene Methyl Ester (A-3)

Methanol was added to the polymer (A-1) in a molar equivalent weight of 1.05 relative to the maleic anhydride groups in the polymer, and the mixture was reacted at 90° C. for 10 hours to give a maleic anhydride-modified liquid polyisoprene methyl ester (A-3) (hereinafter, also written as the "polymer (A-3)"). The reaction ratio of the maleic anhydride-derived functional groups in the polymer (A-3) was determined by infrared absorption spectroscopy to be 100%.

Production Example 4: Maleic Anhydride-Modified Liquid Polyisoprene Methyl Ester (A-4)

Methanol was added to the polymer (A-2) in a molar equivalent weight of 1.05 relative to the maleic anhydride groups in the polymer, and the mixture was reacted at 90° C. for 10 hours to give a maleic anhydride-modified liquid polyisoprene methyl ester (A-4) (hereinafter, also written as the "polymer (A-4)"). The reaction ratio of the maleic anhydride-derived functional groups in the polymer (A-4) was determined by infrared absorption spectroscopy to be 100%.

Comparative Production Example 2: Liquid Polyisoprene (A'-2)

A thoroughly dried pressure-resistant container was purged with nitrogen. The pressure-resistant container was then loaded with 600 g of n-hexane and 21.9 g of n-butyllithium (a 17 mass % hexane solution). The temperature was increased to 70° C. While performing stirring, 2050 g of isoprene was added, and the polymerization was performed for 1 hour while controlling the polymerization temperature at 70° C. The polymerization reaction was then terminated by the addition of methanol. A polymer solution (2672 g) was thus obtained. Water was added to the polymerization solution, and the mixture was stirred to wash the polymerization solution with water. The stirring was terminated. After the liquid had separated into the polymer solution phase and the aqueous phase, the water was removed. After the completion of washing, the polymerization solution was dried at 70° C. for 12 hours to afford a liquid polyisoprene (hereinafter, also written as the "polymer (A'-2)").

Comparative Production Example 3: Maleic Anhydride-Modified Liquid Polyisoprene (A"-1)

A thoroughly dried pressure-resistant container was purged with nitrogen. The pressure-resistant container was then loaded with 600 g of n-hexane and 39.3 g of n-butyllithium (a 17 mass % hexane solution). The temperature was increased to 70° C. While performing stirring, 2050 g of isoprene was added, and the polymerization was performed for 1 hour while controlling the polymerization temperature at 70° C. The polymerization reaction was then terminated by the addition of methanol. A polymer solution (2689 g) was thus obtained. Water was added to the polymerization solution, and the mixture was stirred to wash the polymerization solution with water. The stirring was terminated. After the liquid had separated into the polymer solution phase and the aqueous phase, the water was removed. After the completion of washing, the polymerization solution was dried at 70° C. for 12 hours to afford a liquid polyisoprene (hereinafter, also written as the "polymer (A'-3)"). 1.5 Parts by mass of maleic anhydride and 0.1 part by mass of BHT (2,6-di-t-butyl-4-methylphenol, manufactured by Honshu Chemical Industry Co., Ltd.) were added to 100 parts by mass of the polymer (A'-3), and the mixture was reacted at 160° C. for 20 hours to give a maleic anhydride-modified liquid polyisoprene (A"-1) (hereinafter, also written as the "polymer (A"-1)"). The reaction ratio of maleic anhydride was determined by acid value titration to be at least 99%, and the equivalent weight of functional groups (a) derived from the acid anhydride in the polymer (A"-1) was 6,700 g/eq.

Comparative Production Example 4: Maleic Anhydride-Modified Liquid Polyisoprene Methyl Ester (A"-2)

5 Parts by mass of maleic anhydride and 0.1 part by mass of BHT (2,6-di-t-butyl-4-methylphenol, manufactured by Honshu Chemical Industry Co., Ltd.) were added to 100 parts by mass of the polymer (A'-3), and the mixture was reacted at 160° C. for 20 hours. Thereafter, methanol was added in a molar equivalent weight of 1.05 relative to the maleic anhydride groups in the polymer, and the mixture was reacted at 90° C. for 10 hours to give a maleic anhydride-modified liquid polyisoprene methyl ester (A"-2) (hereinafter, also written as the "polymer (A"-2)"). The reaction ratio of maleic anhydride was determined by acid value titration to be at least 99%, and the equivalent weight of functional groups (a) derived from the acid anhydride in the polymer (A"-2) was 2,100 g/eq. Further, the reaction ratio of the maleic anhydride-derived functional groups in the polymer (A"-2) was determined by infrared absorption spectroscopy to be 100%.

Properties of the materials such as the modified liquid diene rubbers (A) were measured and calculated by the following methods.

(Method for Measuring Number Average Molecular Weight and Molecular Weight Distribution)

The Mn and Mw of the polymers obtained in Production Examples 1 to 4 and Comparative Production Examples 1 to 4 were measured by GPC (gel permeation chromatography) relative to standard polystyrenes. The Mw/Mn was calculated from the values obtained. The measurement involved the following apparatus and conditions.

Apparatus: GPC apparatus "HLC-8320 GPC" manufactured by TOSOH CORPORATION
Separation column: Column "TSKgel Super HZ4000" manufactured by TOSOH CORPORATION
Eluent: Tetrahydrofuran
Eluent flow rate: 0.7 mL/min
Sample concentration: 5 mg/10 mL
Column temperature: 40° C.

(Vinyl Content)

The vinyl content in the liquid diene rubber obtained in each Production Example was measured with $^1$H-NMR (500 MHz) manufactured by JEOL Ltd. The concentration was sample/deuterated chloroform=50 mg/1 mL. The number of scans was 1024. With respect to the spectrum obtained, the vinyl content was calculated from the ratio of the area of double-bond peaks assigned to vinylated diene compounds to the area of double-bond peaks assigned to non-vinylated diene compounds.

(Method for Measuring Melt Viscosity)

The melt viscosities of the polymers obtained in Production Examples 1 to 4 and Comparative Production Examples 1 to 4 were measured at 38° C. and 60° C. with a Brookfield viscometer (manufactured by BROOKFIELD ENGINEERING LABS. INC.).

(Method for Measuring Glass Transition Temperature)

The polymers obtained in Production Examples 1 to 4 and Comparative Production Examples 1 to 4, each weighing 10 mg, were sampled into aluminum pans and were analyzed by differential scanning calorimetry (DSC) at a heat-up rate of 10° C./min. With respect to the thermograms obtained, the peak top value of the DDSC curve was adopted as the glass transition temperature (Tg).

(Addition Reaction Ratio)

3 g of a sample after the modification reaction was dissolved by the addition of 180 mL of toluene and 20 mL of ethanol. The solution was titrated to neutrality with 0.1 N ethanol solution of potassium hydroxide, and thereby the acid value was determined.

$$\text{Acid value(meq/g)} = (A-B) \times F/S$$

A: Volume (mL) of 0.1 N ethanol solution of potassium hydroxide dropped until neutrality
B: Volume (mL) of 0.1 N ethanol solution of potassium hydroxide dropped to blank containing no sample
F: Potassium value of 0.1 N ethanol solution of potassium hydroxide
S: Mass (g) of sample weighed out Separately, the sample after the modification reaction was washed with methanol (5 mL per 1 g of the sample) four times to remove the unreacted maleic anhydride. The sample was thereafter dried under reduced pressure at 80° C. for 12 hours, and the acid value was determined in the same manner as described above. The addition reaction ratio of the modifying agent was calculated based on the following equation.

[Addition reaction ratio (%) of modifying agent]= [Acid value(meq/g)after washing]/[Acid value (meq/g)before washing]×100

(Functional Group Equivalent Weight)

Using the acid value after washing which had been determined above, the equivalent weight of functional groups (a) derived from the acid anhydride was calculated based on the following equation.

[Equivalent weight(g/eq) of functional groups(a) derived from acid anhydride]=1,000/[Acid value (meq/g)after washing]

(Reaction Ratio of Acid Anhydride Groups)

When the acid anhydride-modified liquid diene rubber had been reacted with a compound represented by the chemical formula (2) or (3), the reaction ratio of the acid anhydride groups was calculated using the equation below based on infrared absorption spectra measured before and after the reaction with Fourier transform infrared spectrophotometer FT/IR-4200 (manufactured by JASCO Corporation).

[Reaction ratio (%) of acid anhydride groups]=[1− (Peak intensity ratio of acid anhydride-derived functional groups after reaction)/(Peak intensity ratio of acid anhydride-derived functional groups before reaction)]×100

In the case where the acid anhydride used in the reaction is maleic anhydride, a peak assigned to C=O stretching of the unreacted material arises near 1781 cm$^{-1}$, and this peak may be used in the determination of the intensity ratio relative to the peak assigned to the polymer main chain structure that is constant before and after the reaction.

TABLE 1

| | Number average molecular weight Mn | Molecular weight distribution Mw/Mn | Vinyl content (mol %) | Tg (° C.) | Modifying agents | Functional group equivalent weight (g/eq) | Melt viscosities 38° C. (Pa · s) | Melt viscosities 60° C. (Pa · s) | X (K) |
|---|---|---|---|---|---|---|---|---|---|
| Prod. Ex. 1 (A-1) | 9,800 | 1.07 | 7 | −60 | Maleic anhydride | 2,100 | 7.2 | 1.8 | 6111 |
| Prod. Ex. 2 (A-2) | 10,000 | 1.07 | 7 | −60 | Maleic anhydride | 1,100 | 23.5 | 4.5 | 7310 |
| Prod. Ex. 3 (A-3) | 9,800 | 1.06 | 7 | −59 | Maleic anhydride Methanol | 2,100 | 12.7 | 2.9 | 6478 |
| Prod. Ex. 4 (A-4) | 10,000 | 1.06 | 7 | −58 | Maleic anhydride Methanol | 1,100 | 48.3 | 8.6 | 7692 |
| Comp. Prod. Ex. 1 (A'-1) | 9,300 | 1.03 | 7 | −63 | — | — | 2.5 | 0.7 | 5731 |
| Comp. Prod. Ex. 2 (A'-2) | 55,000 | 1.20 | 7 | −63 | — | — | 490 | 144 | 5763 |
| Comp. Prod. Ex. 3 (A"-1) | 33,000 | 1.35 | 7 | −60 | Maleic anhydride | 6,700 | 130 | 38.4 | 5738 |
| Comp. Prod. Ex. 4 (A"-2) | 34,000 | 1.41 | 7 | −59 | Maleic anhydride Methanol | 2,100 | 200 | 55.5 | 6035 |

Examples 1 to 7 and Comparative Examples 1 to 6

The modified liquid diene rubber (A) or the diene rubber, the solid rubber (B), the phenolic resin (C), the oil, the carbon black, zinc oxide, stearic acid and the antioxidants were added in the amounts (parts by mass) described in Table 2 into an internal Banbury mixer and were kneaded together for 6 minutes from a start temperature of 50° C. to a resin temperature of 150° C. Thereafter, the kneaded mixture was removed from the mixer and was cooled to room temperature. Next, the mixture was placed into the Banbury mixer again, and the curing agent (D), sulfur and the vulcanization accelerator were added. The resultant mixture was kneaded for 75 seconds from a start temperature of 50° C. to a maximum temperature of 100° C. A rubber composition was thus obtained.

(Mooney Viscosity)
As an index of the processability of the rubber composition, the Mooney viscosity (ML1+4) of the rubber composition before vulcanization was measured at 130° C. in accordance with JIS K6300.
The data of Mooney viscosity in Table 2 are values relative to the value of Comparative Example 1 taken as 100. The smaller the value, the more excellent the processability of the composition.

(Molding Properties)
A sheet of the rubber composition prepared in Example or Comparative Example was cut into small pieces and was added to twin-bore capillary rheometer R6000 (manufactured by IMATEK) equipped with a long die (2 ϕ/32 mm) and a short die (2 ϕ/0.25 mm). The composition was extruded at 120° C. and a shear rate of 100/s or 500/s. The shapes of the strands obtained were visually inspected to evaluate molding properties.
◯: The strand was free from twist.
x: The strand twisted.

TABLE 2

| | | | Ex. 1 | Ex. 2 | Ex. 3 | Ex. 4 | Ex. 5 | Ex. 6 | Ex. 7 |
|---|---|---|---|---|---|---|---|---|---|
| Amounts (parts by mass) | Solid rubber (component B) | Natural rubber (1) | 100 | 100 | 100 | 100 | 100 | 100 | 100 |
| | Modified liquid diene rubber (component A) | A-1 | 5.3 | 11.1 | | | | | |
| | | A-2 | | | 5.3 | | | | |
| | | A-3 | | | | 5.3 | 11.1 | | |
| | | A-4 | | | | | | 5.3 | 11.1 |
| | Diene rubber | IR-2200 | | | | | | | |
| | | A'-2 | | | | | | | |
| | | A"-1 | | | | | | | |
| | | A"-2 | | | | | | | |
| | Phenolic resin (component C) | Solid novolak resin | 10.5 | 11.1 | 10.5 | 10.5 | 11.1 | 10.5 | 11.1 |
| | Curing agent (component D) | Hexamethylenetetramine | 1.1 | 1.1 | 1.1 | 1.1 | 1.1 | 1.1 | 1.1 |
| | Optional components | Oil | 5.3 | 5.6 | 5.3 | 5.3 | 5.6 | 5.3 | 5.6 |
| | | Carbon black | 73.7 | 77.8 | 73.7 | 73.7 | 77.8 | 73.7 | 77.8 |
| | | Sulfur (1) | 4.2 | 4.4 | 4.2 | 4.2 | 4.4 | 4.2 | 4.4 |
| | | Vulcanization accelerator (1) | 1.8 | 1.9 | 1.8 | 1.8 | 1.9 | 1.8 | 1.9 |
| | | Zinc oxide | 5.3 | 5.6 | 5.3 | 5.3 | 5.6 | 5.3 | 5.6 |
| | | Stearic acid | 2.1 | 2.2 | 2.1 | 2.1 | 2.2 | 2.1 | 2.2 |
| | | Antioxidant (1) | 1.1 | 1.1 | 1.1 | 1.1 | 1.1 | 1.1 | 1.1 |
| | | Antioxidant (2) | 1.1 | 1.1 | 1.1 | 1.1 | 1.1 | 1.1 | 1.1 |

TABLE 2-continued

| Processability | Mooney viscosity | 90 | 86 | 95 | 90 | 82 | 94 | 88 |
|---|---|---|---|---|---|---|---|---|
| Molding properties | 100/s | ○ | ○ | ○ | ○ | ○ | ○ | ○ |
| | 500/s | ○ | ○ | ○ | x | ○ | x | x |

| | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Amounts (parts by mass) | Solid rubber (component B) | Natural rubber (1) | 100 | 100 | 100 | 100 | 100 | 100 |
| | Modified liquid diene rubber (component A) | A-1 | | | | | | |
| | | A-2 | | | | | | |
| | | A-3 | | | | | | |
| | | A-4 | | | | | | |
| | Diene rubber | IR-2200 | 11.1 | | | | | |
| | | A'-2 | | 5.3 | 11.1 | | | |
| | | A''-1 | | | | 5.3 | | |
| | | A''-2 | | | | | 5.3 | 11.1 |
| | Phenolic resin (component C) | Solid novolak resin | 11.1 | 10.5 | 11.1 | 10.5 | 10.5 | 11.1 |
| | Curing agent (component D) | Hexamethylenetetramine | 1.1 | 1.1 | 1.1 | 1.1 | 1.1 | 1.1 |
| | Optional components | Oil | 5.6 | 5.3 | 5.6 | 5.3 | 5.3 | 5.6 |
| | | Carbon black | 77.8 | 73.7 | 77.8 | 73.7 | 73.7 | 77.8 |
| | | Sulfur (1) | 4.4 | 4.2 | 4.4 | 4.2 | 4.2 | 4.4 |
| | | Vulcanization accelerator (1) | 1.9 | 1.8 | 1.9 | 1.8 | 1.8 | 1.9 |
| | | Zinc oxide | 5.6 | 5.3 | 5.6 | 5.3 | 5.3 | 5.6 |
| | | Stearic acid | 2.2 | 2.1 | 2.2 | 2.1 | 2.1 | 2.2 |
| | | Antioxidant (1) | 1.1 | 1.1 | 1.1 | 1.1 | 1.1 | 1.1 |
| | | Antioxidant (2) | 1.1 | 1.1 | 1.1 | 1.1 | 1.1 | 1.1 |
| Processability | | Mooney viscosity | 100 | 94 | 83 | 90 | 93 | 94 |
| Molding properties | | 100/s | ○ | ○ | ○ | ○ | ○ | ○ |
| | | 500/s | x | x | ○ | x | x | x |

Further, the rubber compositions obtained were subjected to press forming (145° C., 15 to 25 minutes) to give sheets (2 mm in thickness) of a crosslinked product (a vulcanized rubber). The sheets were tested by the following methods to evaluate the hardness, the breaking energy and the storage modulus. The results are described in Table 3.

(Hardness)

The crosslinked sheet prepared in Example or Comparative Example was analyzed with a type D hardness meter in accordance with JIS K6253 to determine the hardness. The data obtained in Examples and Comparative Examples are values relative to the value of Comparative Example 1 in Table 3 taken as 100. With increasing magnitude of the value, the composition is deformed less and is more rigid.

(Breaking Energy)

A JIS dumbbell-shaped No. 3 test piece was punched out from the sheet of the rubber composition prepared in Example or Comparative Example, and the tensile breaking energy was measured with an Instron tensile tester in accordance with JIS K6251. The data obtained in Examples and Comparative Examples are values relative to the value of Comparative Example 1 in Table 3 taken as 100. The larger the value, the more excellent the strength of the composition.

(Storage Modulus)

The sheet of the rubber composition prepared in Example or Comparative Example was cut to give a test piece 40 mm in length and 5 mm in width. The test piece was tested on a dynamic viscoelastometer manufactured by GABO GmbH at a measurement temperature of 30° C., a frequency of 10 Hz, a static strain of 10% and a dynamic strain of 2% to determine the storage modulus. The data obtained in Examples and Comparative Examples are values relative to the value of Comparative Example 1 in Table 3 taken as 100. With increasing magnitude of the value, the composition is deformed less and is more rigid.

TABLE 3

| | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| Diene rubber | Type | A-1 | | A-2 | A-3 | | A-4 | | IR-2200 | A'-2 | | A''-1 | A''-2 | |
| | Amount (parts by mass) | 5.3 | 11.1 | 5.3 | 5.3 | 11.1 | 5.3 | 11.1 | 11.1 | 5.3 | 11.1 | 5.3 | 5.3 | 11.1 |
| Mechanical characteristics | Hardness | 105 | 105 | 108 | 105 | 105 | 108 | 113 | 100 | 103 | 103 | 105 | 105 | 111 |
| | Breaking energy | 95 | 99 | 95 | 92 | 82 | 89 | 88 | 100 | 99 | 93 | 96 | 82 | 76 |
| Viscoelasticity | Storage modulus | 113 | 126 | 121 | 132 | 134 | 141 | 172 | 100 | 108 | 109 | 112 | 141 | 198 |

From the comparison between Comparative Example 1 and Comparative Example 3 with reference to Table 2 and Table 3, Comparative Example 3 in which the unmodified liquid polyisoprene obtained in Comparative Production Example 2 was used as the diene rubber resulted in a lower Mooney viscosity than Comparative Example 1 which involved a synthetic isoprene rubber as the diene rubber. Thus, the unmodified liquid polyisoprene obtained in Comparative Production Example 2, although failing to satisfy the requirements (I) to (III) according to the present invention, was demonstrated to have higher processability than the synthetic isoprene rubber. Here, from the comparison of Example 2 to Comparative Examples 1 and 3 based on Tables 2 and 3, Example 2 which involved the modified liquid diene rubber satisfying the requirements of the present invention resulted in a lower Mooney viscosity than Comparative Example 1 and attained as improved processability as in Comparative Example 3, and was further shown to outperform Comparative Example 3 in terms of mechanical characteristics, specifically, hardness and breaking energy, and also in terms of rigidity as indicated by the significant enhancement in storage modulus.

Example 5 involved the modified liquid polyisoprene satisfying the requirements of the present invention. In Comparative Example 6, use was made of the modified liquid polyisoprene from Comparative Production Example 4 which had the same functional group equivalent weight as Example 5 and did not satisfy the requirement (III). From the comparison of these Example and Comparative Example to Comparative Example 1, Example 5 and Comparative Example 6 resulted in a low Mooney viscosity and attained improvements in processability as compared to Comparative Example 1, and Example 5 achieved a further enhancement in processability over Comparative Example 6. Further, Example 5 and Comparative Example 6 attained sufficient improvements in storage modulus over Comparative Example 1, and Example 5 also achieved an enhancement in molding properties at 500/s.

Example 3 involved the liquid polyisoprene modified with maleic anhydride. In Example 6, this liquid polyisoprene was further modified with methanol. The comparison of these Examples shows that Example 3 attained higher molding properties at 500/s while the storage modulus was more excellent in Example 6, and thus these compositions may be used in different applications in accordance with the desired performance.

From the comparison of Example 5 in which the functional group equivalent weight was 2,100 g/eq, Example 7 in which the functional group equivalent weight was 1,100 g/eq, and Comparative Example 1, it has been shown that Examples 5 and 7 achieved higher improvements in hardness and breaking energy than Comparative Example 1, and that the hardness, the breaking energy and the storage modulus were higher in Example 7 than Example 5 while the molding properties at 500/s were more excellent in Example 5 than Example 7. Thus, by controlling the functional group equivalent weight appropriately, the compositions satisfying the requirements of the present invention may be used in different applications in accordance with the desired performance while attaining improvements in properties.

Examples 8 to 11 and Comparative Examples 7 to 9

The modified liquid diene rubber (A) or the diene rubber, the terpene resin, the antioxidant, the epoxy resin and the tertiary amine were mixed together in the amounts (parts by mass) described in Table 4 and were kneaded in a kneader at 50° C. to give a rubber composition. The rubber composition obtained was tested by the methods described below to evaluate properties. The results are described in Table 5.

TABLE 4

| | | | Ex. 8 | Ex. 9 | Ex. 10 | Ex. 11 | Comp. Ex. 7 | Comp. Ex. 8 | Comp. Ex. 9 |
|---|---|---|---|---|---|---|---|---|---|
| Amounts (parts by mass) | Modified liquid diene rubber (component A) | A-1 | 100 | | | | | | |
| | | A-2 | | 100 | | | | | |
| | | A-3 | | | 100 | | | | |
| | | A-4 | | | | 100 | | | |
| | Diene rubber | A'-1 | | | | | 100 | | |
| | | A''-1 | | | | | | 100 | |
| | | A''-2 | | | | | | | 100 |
| | Optional components | Terpene resin | 50 | 50 | 30 | 30 | 50 | 50 | 30 |
| | | Antioxidant (3) | 1 | 1 | 1 | 1 | 1 | 1 | 1 |
| | | Epoxy resin (1) | 15 | 15 | 2 | 2 | 15 | 15 | 2 |
| | | Tertiary amine | 1.5 | 1.5 | 0.1 | 0.1 | 1.5 | 1.5 | 0.1 |

(Holding Power)

The rubber composition prepared in Example or Comparative Example was applied with a thickness of 20 μm onto a 1 mm thick stainless steel plate (SUS304) as an adherend, and was heat treated at 120° C. for 30 minutes. Thereafter, the layer of the rubber composition was cut into a size of 15 mm×12 mm to give a test piece. A 1 kg weight was attached to the test piece, and the time was measured until the weight fell at 25° C. or 40° C. under conditions in accordance with JIS Z 0237. The longer the time to the falling of the weight, the higher the holding power.

(Bond Strength)

The shear bond strength was measured in accordance with JIS K 6850. The test materials were 1 mm thick plates made of stainless steel (SUS304) or aluminum (A5052). The composition was applied with a thickness of 1 mm onto the above substrate, and was crosslinked at 120° C. for 30 minutes to give a specimen, which was then tested to measure the shear bond strength. The stress rate in the measurement of the shear bond strength was 50 mm/min. The bond strength was compared to that of Comparative Example 8 and was evaluated under the following criteria.

A: 1.5 Times or more higher than the bond strength of Comparative Example 8.

B: From 0.75 to less than 1.5 times higher than the bond strength of Comparative Example 8.

C: From 0.5 to less than 0.75 times higher than the bond strength of Comparative Example 8.

D: Less than 0.5 times higher than the bond strength of Comparative Example 8.

(Applicability)

The rubber composition obtained was loaded into a cartridge gun and was applied onto a stainless steel plate (SUS304). The workability during this process was evaluated as ○ when the composition was applied easily without forming a string, and as x when the composition was highly viscous and difficult to apply and formed a string.

(Dripping Resistance)

The rubber composition obtained was loaded into a cartridge gun and was applied onto a stainless steel plate (SUS304). The dripping resistance during this process was visually evaluated as ○ when there were no drips of the composition and as x when there were drips.

TABLE 5

| | | Ex. 8 | Ex. 9 | Ex. 10 | Ex. 11 | Comp. Ex. 7 | Comp. Ex. 8 | Comp. Ex. 9 |
|---|---|---|---|---|---|---|---|---|
| Holding power | Holding time (min) at 25° C. | >120 | >120 | >120 | >120 | <5 | >120 | >120 |
| | Holding time (min) at 40° C. | >120 | >120 | 7 | 26 | <5 | >120 | 14 |
| Bond strength | With respect to stainless steel | B | B | A | A | D | B | A |
| | With respect to aluminum | B | B | A | A | D | B | A |
| Applicability | | ○ | ○ | ○ | ○ | ○ | x | x |
| Dripping resistance | | ○ | ○ | ○ | ○ | x | ○ | ○ |

The comparison of Examples 8 to 11 with Comparative Examples 7 to 9 shows that the rubber compositions obtained with the modified liquid diene rubber (A) from Production Example according to the present invention concurrently satisfy holding power, bond strength, applicability and dripping resistance.

Examples 12 to 15 and Comparative Examples 10 to 12

The modified liquid diene rubber (A) or the diene rubber, the solid rubber (B), calcium carbonate, the naphthenic oil, stearic acid, zinc oxide and the antioxidant were mixed together in the amounts (parts by mass) described in Table 6 and were kneaded in a Brabender mixer at 50° C. Next, sulfur and the vulcanization accelerators were added in the amounts described in Table 6, and the resultant mixture was kneaded at 50° C. to give a rubber composition. The rubber composition obtained was tested by the methods described below to evaluate properties. The results are described in Table 7.

TABLE 6

| | | | Ex. 12 | Ex. 13 | Ex. 14 | Ex. 15 | Comp. Ex. 10 | Comp. Ex. 11 | Comp. Ex. 12 |
|---|---|---|---|---|---|---|---|---|---|
| Amounts (parts by mass) | Solid rubber (component B) | Polybutadiene rubber | 40 | 40 | 40 | 40 | 40 | 40 | 40 |
| | Modified liquid diene rubber (component A) | A-1 | 60 | | | | | | |
| | | A-2 | | 60 | | | | | |
| | | A-3 | | | 60 | | | | |
| | | A-4 | | | | 60 | | | |
| | Diene rubber | A'-1 | | | | | 60 | | |
| | | A''-1 | | | | | | 60 | |
| | | A''-2 | | | | | | | 60 |
| | Optional components | Calcium carbonate | 300 | 300 | 300 | 300 | 300 | 300 | 300 |
| | | Naphthenic oil | 100 | 100 | 100 | 100 | 100 | 100 | 100 |
| | | Sulfur (2) | 5 | 5 | 5 | 5 | 5 | 5 | 5 |
| | | Vulcanization accelerator (2) | 3 | 3 | 3 | 3 | 3 | 3 | 3 |
| | | Vulcanization accelerator (3) | 2 | 2 | 2 | 2 | 2 | 2 | 2 |

TABLE 6-continued

|  | Ex. 12 | Ex. 13 | Ex. 14 | Ex. 15 | Comp. Ex. 10 | Comp. Ex. 11 | Comp. Ex. 12 |
|---|---|---|---|---|---|---|---|
| Stearic acid | 1 | 1 | 1 | 1 | 1 | 1 | 1 |
| Zinc oxide | 3 | 3 | 3 | 3 | 3 | 3 | 3 |
| Antioxidant (3) | 1 | 1 | 1 | 1 | 1 | 1 | 1 |

(Bond Strength)

The shear bond strength was measured in accordance with JIS K 6850. The test materials were 1 mm thick plates made of stainless steel (SUS304), aluminum (A5052) or polyethylene (HDPE, shore hardness D 60). The composition was applied with a thickness of 1 mm onto the above substrate, and was crosslinked at 150° C. for 30 minutes to give a specimen, which was then tested to measure the shear bond strength. The stress rate in the measurement of the shear bond strength was 50 mm/min. The bond strength was compared to that of Comparative Example 11 and was evaluated under the following criteria.

A: 1.5 Times or more higher than the bond strength of Comparative Example 11.

B: From 0.75 to less than 1.5 times higher than the bond strength of Comparative Example 11.

C: From 0.5 to less than 0.75 times higher than the bond strength of Comparative Example 11.

D: Less than 0.5 times higher than the bond strength of Comparative Example 11.

(Applicability)

The rubber composition obtained was loaded into a cartridge gun and was applied onto a stainless steel plate (SUS304). The workability during this process was evaluated as ○ when the composition was applied easily without forming a string, and as x when the composition was highly viscous and difficult to apply and formed a string.

for 4 hours to give an epoxy resin cured product. The cured product was tested by the methods described below to evaluate the viscosity, the deflection temperature under load, the flexural strength, the flexural modulus, the flexural strain and the Izod impact strength. The results are described in Table 8.

(Viscosity)

The mixture of the modified liquid diene rubber (A) and the epoxy resin was analyzed with TVE-22LT manufactured by TOKI SANGYO CO., LTD. in accordance with JIS K 7117-2 to measure the viscosity. The measurement conditions are described below.

Temperature: 23° C.

Rotor: 3°×R 9.7

Rotational speed: 0.5 rpm

Measurement time: Allowed to stand for 1 minute and thereafter tested for 1 minute (Deflection Temperature Under Load)

The deflection temperature under load of the epoxy resin cured product obtained was determined with heat distortion tester No. 148-HD-PC manufactured by YASUDA SEIKI SEISAKUSHO, LTD. in accordance with JIS K 7191-2 (flatwise, method A). The higher the deflection temperature under load, the more excellent the heat resistance of the epoxy resin cured product.

TABLE 7

|  |  | Ex. 12 | Ex. 13 | Ex. 14 | Ex. 15 | Comp. Ex. 10 | Comp. Ex. 11 | Comp. Ex. 12 |
|---|---|---|---|---|---|---|---|---|
| Bond strength | With respect to stainless steel | B | B | B | A | D | B | B |
|  | With respect to aluminum | B | B | B | A | D | B | B |
|  | With respect to polyethylene | B | B | B | B | C | B | B |
| Applicability |  | ○ | ○ | ○ | ○ | ○ | x | x |

The comparison of Examples 12 to 15 with Comparative Examples 10 to 12 shows that the rubber compositions obtained with the modified liquid diene rubber (A) from Production Example according to the present invention, and the solid rubber (B) concurrently satisfy bond strength and applicability.

Examples 16 to 18 and Comparative Examples 13 and 14

With use of a planetary centrifugal stirring deaerator (manufactured by THINKY CORPORATION), the modified liquid diene rubber (A) and the epoxy resin were mixed together in the amounts (parts by mass) described in Table 8 for 4 minutes and deaerated for 2 minutes. Further, the epoxy resin curing agent was added to the mixture, and the resultant mixture was mixed for 4 minutes and deaerated for 2 minutes to give an epoxy resin composition. The epoxy resin composition obtained was poured into a molding frame, and was heated at 60° C. for 4 hours and was further heated to 150° C. at a heat-up rate of 30° C./h, and was cured (Flexural Strength, Flexural Modulus and Flexural Strain)

The epoxy resin cured product obtained was tested on Instron universal material tester 5966 in accordance with JIS K 7171 to measure the flexural strength, the flexural modulus and the flexural strain. The measurement conditions are described below. The higher the flexural strength, the flexural modulus and the flexural strain, the more excellent the flexural properties of the epoxy resin cured product.

Test piece: 80 mm×10 mm×4 mm

Test speed: 2 mm/min

Distance between supports: 64 mm (Izod Impact Strength)

The epoxy resin cured product obtained was tested on digital impact tester DG-UB manufactured by Toyo Seiki Seisaku-sho, Ltd. in accordance with JIS K 7110 to measure the Izod impact strength. The measurement conditions are described below. The higher the Izod impact strength, the higher the impact resistance of the epoxy resin cured product.

Test piece: 80 mm×10 mm×4 mm, no notches

Measurement conditions: hammer/1.0 J

TABLE 8

| | | | Ex. 16 | Ex. 17 | Ex. 18 | Comp. Ex. 13 | Comp. Ex. 14 |
|---|---|---|---|---|---|---|---|
| Amounts (parts by mass) | Epoxy resin (2) | jER828 | 100 | 100 | 100 | 100 | 100 |
| | Modified liquid diene rubber (component A) | A-1 | 10 | | | | |
| | | A-3 | | 10 | 20 | | |
| | | A"-1 | | | | 10 | |
| | | A"-2 | | | | | 10 |
| | Epoxy curing agent | 2E4MZ | 3 | 3 | 3 | 3 | 3 |
| Properties | Viscosity (Pa·s) | | 23.5 | 23.0 | 30.2 | 25.0 | 24.2 |
| | Deflection temperature under load (° C.) | | 155 | 150 | 130 | 158 | 154 |
| | Flexural strength (MPa) | | 58.2 | 70.5 | 37.3 | 40.7 | 43.6 |
| | Flexural modulus (GPa) | | 2.1 | 2.1 | 1.7 | 1.8 | 1.7 |
| | Flexural strain (%) | | 3.8 | 6.1 | 2.7 | 2.7 | 3.6 |
| | Izod impact strength (kJ/m$^2$) | | 7.9 | 12.0 | 7.0 | 5.5 | 7.5 |

The comparison of Examples 16 to 18 with Comparative Examples 13 and 14 shows that the epoxy resin compositions obtained with the modified liquid diene rubber (A) satisfying the requirements of the present invention concurrently satisfy heat resistance, flexural properties and impact resistance. Further, the modified liquid diene rubber (A)-epoxy resin mixtures obtained using the modified liquid diene rubber (A) satisfying the requirements of the present invention have been shown to exhibit a low viscosity. Thus, enhancements may be attained in the workability during the preparation of epoxy resin compositions and in the molding properties of epoxy resin compositions.

INDUSTRIAL APPLICABILITY

The rubber compositions obtained in accordance with the present invention exhibit excellent workability and give crosslinked products having outstanding adhesion. Thus, the rubber compositions may be suitably used in applications such as sealing materials, and bonding of various parts, and are useful as, among others, adhesives and pressure-sensitive adhesives, numerous industrial products such as automobiles, and daily goods. Further, the rubber compositions of the present invention may be suitably used and are useful also as tire bead fillers. Further, the curable resin compositions including the modified liquid diene rubber (A) of the present invention can attain enhancements in heat resistance, mechanical characteristics and impact resistance without deteriorations in properties of the curable resins, and are thus useful.

The invention claimed is:
1. A rubber composition, comprising:
a modified liquid diene rubber (A); and
a solid rubber (B),
wherein the modified liquid diene rubber (A) has a functional group (a) derived from an acid anhydride, and satisfies (I), (II), and (III) below:

(I) a functional group equivalent weight of the functional groups (a) is in a range of 400 to 3,500 g/eq,
(II) a polystyrene-equivalent number average molecular weight (Mn) measured by gel permeation chromatography (GPC) is in a range of 5,000 to 20,000, and
(III) a melt viscosity at 38° C. is not less than 3 Pa·s and X (K) is not less than 6100 K wherein X is a slope of a linear line passing through two points in a graph in which the two points are values of melt viscosity η(Pa·s) at 38° C. and 60° C. measured with a Brookfield viscometer which are plotted as Ln[η/(Pa·s)] on ordinate versus 1/T (K$^{-1}$) on abscissa wherein T is a temperature (K), and the modified liquid diene rubber (A) is a product of reaction of a liquid diene rubber modified with an unsaturated carboxylic acid anhydride, and a compound of chemical formula (2) or (3):

$$R^a\text{—OH} \qquad (2)$$

wherein $R^a$ is a hydrogen atom or an optionally substituted alkyl group,

$$R^b_2\text{—NH} \qquad (3)$$

wherein $R^b$ at each occurrence is a hydrogen atom or an optionally substituted alkyl group and is optionally the same as or different from one another.

2. A sealing material, comprising:
the rubber composition of claim 1.
3. A tire bead filler rubber composition, comprising:
the rubber composition of claim 1.
4. The tire bead filler rubber composition of claim 3, wherein the tire bead filler rubber composition comprises:
100 parts by mass of the solid rubber (B),
1 to 20 parts by mass of the modified liquid diene rubber (A),
5 to 40 parts by mass of a phenolic resin (C), and
0.5 to 2.0 parts by mass of a curing agent (D).

* * * * *